US010986373B2

(12) United States Patent
Mochizuki et al.

(10) Patent No.: US 10,986,373 B2
(45) Date of Patent: Apr. 20, 2021

(54) MOVING IMAGE ENCODING METHOD, MOVING IMAGE DECODING METHOD, MOVING IMAGE ENCODING DEVICE, AND MOVING IMAGE DECODING DEVICE

(71) Applicant: Renesas Electronics Corporation, Tokyo (JP)

(72) Inventors: Seiji Mochizuki, Kanagawa (JP); Kazushi Akie, Kanagawa (JP); Tetsuya Shibayama, Kanagawa (JP); Kenichi Iwata, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/648,180

(22) Filed: Jul. 12, 2017

(65) Prior Publication Data

US 2017/0311001 A1 Oct. 26, 2017

Related U.S. Application Data

(63) Continuation of application No. 13/519,874, filed as application No. PCT/JP2010/072472 on Dec. 14, 2010.

(30) Foreign Application Priority Data

Jan. 19, 2010 (JP) .............................. JP2010-008864

(51) Int. Cl.
*H04N 19/85* (2014.01)
*H04N 19/43* (2014.01)
(Continued)

(52) U.S. Cl.
CPC ........... *H04N 19/85* (2014.11); *H04N 19/129* (2014.11); *H04N 19/176* (2014.11); *H04N 19/423* (2014.11); *H04N 19/436* (2014.11)

(58) Field of Classification Search
CPC .. H04N 19/129; H04N 19/176; H04N 19/423; H04N 19/436; H04N 19/85
(Continued)

(56) References Cited

U.S. PATENT DOCUMENTS 5,491,509 A 2/1996 Jeong et al.
6,332,003 B1 12/2001 Matsuura
(Continued)

FOREIGN PATENT DOCUMENTS

CN 1068754 C 7/2001
EP 0 633 699 A2 1/1995
(Continued)

OTHER PUBLICATIONS

United States Non-Final Office Action dated Feb. 28, 2015 in U.S. Appl. No. 13/519,874.
(Continued)

*Primary Examiner* — Joon Kwon
(74) *Attorney, Agent, or Firm* — McGinn IP Law Group, PLLC

(57) ABSTRACT

An image encoding device includes an encoding circuit configured to encode an image, the image being constituted of a plurality of columns and a plurality of rows of which width are longer than the columns, generate a reference image and stores the reference image into a memory, and output a bit stream including the encoded image. The image encoding device also includes an image rotation circuit configured to rotate the image read from the memory by 90° and output the rotated image to a encoding processing circuit, and a read address generating circuit configured to read the column of the image from the memory, and provide the column with the image rotation circuit.

19 Claims, 9 Drawing Sheets

(51) Int. Cl.
*H04N 19/176* (2014.01)
*H04N 19/436* (2014.01)
*H04N 19/129* (2014.01)
*H04N 19/423* (2014.01)

(58) Field of Classification Search
USPC ..................................................... 375/14.13
See application file for complete search history.

(56) References Cited

U.S. PATENT DOCUMENTS

| | | | |
|---|---|---|---|
| 6,674,910 B1 | 1/2004 | Moon | |
| 7,636,497 B1 * | 12/2009 | Chambers | H04N 5/2628 |
| | | | 382/277 |
| 8,126,046 B2 | 2/2012 | Chiu | |
| 8,135,064 B2 | 3/2012 | Tasaka | |
| 8,233,003 B2 * | 7/2012 | Obinata | G09G 3/3611 |
| | | | 345/555 |
| 2005/0117789 A1 * | 6/2005 | Kim | H04N 19/20 |
| | | | 382/128 |
| 2005/0207493 A1 * | 9/2005 | Kobayakawa | H04N 5/145 |
| | | | 375/240.16 |
| 2006/0126952 A1 * | 6/2006 | Suzuki | H04N 19/61 |
| | | | 382/233 |
| 2006/0139446 A1 * | 6/2006 | Kuroki | H04N 5/23293 |
| | | | 348/14.13 |
| 2006/0176962 A1 * | 8/2006 | Arimura | H04N 19/159 |
| | | | 375/240.24 |
| 2006/0291560 A1 | 12/2006 | Penna et al. | |
| 2007/0046684 A1 | 3/2007 | Jeffrey et al. | |
| 2008/0089426 A1 | 4/2008 | Wang | |
| 2008/0198929 A1 | 8/2008 | Fujihara | |
| 2009/0122864 A1 | 5/2009 | Palfner | |
| 2009/0232211 A1 | 9/2009 | Chen et al. | |
| 2009/0279606 A1 * | 11/2009 | Lee | H04N 7/26037 |
| | | | 375/240.12 |
| 2010/0053181 A1 | 3/2010 | Schlanger et al. | |
| 2010/0135389 A1 | 6/2010 | Tanizawa et al. | |

FOREIGN PATENT DOCUMENTS

| | | |
|---|---|---|
| TW | 200818900 A | 4/2008 |
| TW | 200913724 A | 3/2009 |
| WO | WO 2005/034516 A1 | 4/2005 |

OTHER PUBLICATIONS

United States Final Office Action dated Jul. 28, 2015 in U.S. Appl. No. 13/519,874.
United States Non-Final Office Action dated Dec. 30, 2015 in U.S. Appl. No. 13/519,874.
United States Final Office Action dated Jul. 13, 2016 in U.S. Appl. No. 13/519,874.
United States Non-Final Office Action dated Apr. 12, 2017 in U.S. Appl. No. 13/519,874.
International Search Report in PCT/JP2010/072472 dated Mar. 22, 2011(English Translation Thereof).
Thomas Wiegand et al, "Overview of the H.264/AVC Video Coding Standard", IEEE Transactions on Circuits and Systems for Video Technology, Jul. 2003, pp. 1-19.
Gary J. Sullivan et al., "Video Compression-From Concept to the H.264/AVC Standard", Proceeding of the IEEE, vol. 93, No. 1, Jan. 2005, pp. 18-31.
Iwata, K. et al, "A 342mW Mobile Application Processor with Full-HDMulti-Standard Video Codec", IEEE Int. Solid-State Circuits Conf. 2009 Digest of Technical Papers, Feb. 8, 2009, p. 158-159,159a.
Iwata, K. et al., "A 256mW Full-HD H.264 High-Profile CODEC Featuring Dual Macroblock-Pipeline Architecture in 65nm CMOS", Proc. Of IEEE Symp. On VLSI Circuits, Jun. 18, 2008, p. 102-103.
Extended European Search Report dated Dec. 22, 2015.
D-K Kwon et al: "Frame coding in vertical raster scan order". 94. MPEG Meeting; Oct. 11, 2010-Oct. 15, 2010; Guangzhou; (Motion Picture Expert Group or ISO/IEC JTC1/SC29/WG11). No. M18264. Oct. 2, 2010 (Oct. 2, 2010). XP030046854.
Taiwanese Office Acton dated May 7, 2015 with English Translation.
Communication Pursuant to Article 94(3) EPC dated Mar. 13, 2019, in counterpart European Patent Application No. 10 843 962.1.
Xiaolei Chen et al:"New Hardware Architecture Design for Intra Prediction in H.264/AVC High Profile", Computer Science and Engineering, 2009.WCSE '09.Second International Workshop on, Jan. 1, 2009(Jan. 1, 2009), pp. 362-366,XP055564775, Piscataway, NJ, USA.

* cited by examiner

MB TO BE PROCESSED    ONE PICTURE FRAME

ONE PICTURE FRAME

MB PAIR TO BE PROCESSED    ONE PICTURE FRAME

MB PAIR TO BE PROCESSED    ONE PICTURE FRAME

MOVING IMAGE ENCODING METHOD, MOVING IMAGE DECODING METHOD, MOVING IMAGE ENCODING DEVICE, AND MOVING IMAGE DECODING DEVICE

CROSS-REFERENCE TO RELATED APPLICATIONS

The present application is a Continuation Application of U.S. patent application Ser. No. 13/519,874, filed on Jun. 28, 2012, which is based on the International Patent Cooperation Treaty Application PCT/JP2010/072472 filed on Dec. 14, 2010, which is based on Japanese Patent Application No. 2010-008864 filed on Jan. 19, 2010, the entire contents of which are hereby incorporated by reference.

BACKGROUND

The present invention relates to a moving image encoding method, a moving image decoding method, a moving image encoding device and a moving image decoding device, and particularly it relates to a technique useful for curbing the increase in the storage capacity of a memory for storing surrounding macro-block information.

The general compression system for moving images referred to as "MPEG-2" is a standard standardized by ISO/IEC 13818-2. The MPEG-2 is based on the principle that the video storage capacity and the required bandwidth are reduced by removing redundant information from video streams. Incidentally, MPEG is an abbreviation for "Moving Picture Experts Group".

The MPEG-2 standard only defines the bit stream syntax (the compressed and encoded data string's rule or the method for forming a bit stream of encoded data) and the decode process. Therefore, the MPEG-2 standard is flexible enough to use in various situations such as satellite broadcasts and services, cable televisions, interactive televisions and the Internet.

In an encoding process in conformity with the MPEG-2 standard, video signals are sampled and quantized in order to initially define color and brightness components of each pixel of a digital video. The values specifying color and brightness components are converted to frequency values by DCT (Discrete Cosine Transform). The conversion coefficients of DCT have different frequencies according to the brightness and color of a picture. The quantized DCT conversion coefficients are encoded according to VLC (Variable Length Coding) used to further compress video streams.

In the international standard moving image encoding methods such as MPEG-2, MPEG-4 and MPEG-4 AVC (H.264), interframe prediction coding is used in order to realize a high encoding efficiency by use of correlation in the direction of time. Frame encoding modes include I FRAME where a frame is encoded without using correlation between frames, P FRAME where a frame can be predicted from one frame which was encoded in the past, and B FRAME where a frame can be predicted from two frames which were encoded in the past.

In the interframe prediction coding, a reference image (prediction image) subjected to motion compensation is subtracted from a moving image, and prediction residuals resulting from the subtraction are encoded. The process of encoding includes the steps of: orthogonal transform such as DCT (Discrete Cosine Transform); quantization; and variable length coding. The motion compensation (motion correction) includes the step of spatially moving a reference frame for interframe prediction. The motion compensation is performed in units of blocks of a frame to be encoded. With no motion in an image, which means no move, a pixel in the same position as that of a pixel to be predicted is used. However, with any motion included, the most adequate block is searched for, and a move vector is made based on a quantity of the move. A block involved in motion compensation is a block of 16×16 or 16×8 pixels in the MPEG-2 encoding, a block of 16×16, 16×8 or 8×8 pixels in the MPEG-4 encoding, and a block of 16×16, 16×8, 8×16, 8×8, 8×4, 4×8 or 4×4 pixels in the MPEG-4 AVC (H.264) encoding.

The encoding process described above is performed for each video picture frame or field. A picture frame is subdivided into blocks, and each block (usually composed of 16×16 pixels and referred to as "macro-block" or "MB" for short in MPEG) makes a unit of processing of the encoding process. In other words, the most similar block (prediction image) is selected from an already encoded reference image for each block to be encoded, and difference signals of an encoded image (block) and a prediction image are encoded (by orthogonal transform, quantization or the like). The difference in relative position between a block to be encoded in a picture frame and a prediction signal is referred to as "motion vector".

A video encode technique compliant with the recommended H.246/AVC is described in the non patent document presented by Thomas Wiegand et al, "Overview of the H.264/AVC Video Coding Standard", IEEE TRANSACTIONS ON CIRCUITS AND SYSTEMS FOR VIDEO TECHNOLOGY, JULY 2003, PP. 1-19. Video coding according to the recommended H.246/AVC involves: a video coding layer (VCL) designed to effectively represent a video context; and a network abstraction layer (NCL) which formats a video VCL representation and provides header information according to a method adequate for various transfers by a transfer layer and a storage medium.

Further, the following description is included in the non-patent document presented by GARY J. SULLIVAN et al., "Video Compression-From Concept to the H.264/AVC Standard", PROCEEDING OF THE IEEE, VOL. 93, No. 1, JANUARY 2005, PP 0.18-31. That is, the video coding layer (VCL) in H.246/AVC follows an approach referred to as "block based hybrid video coding". The VCL design involves a macro-block, a slice and a slice block. Each picture is split into macro-blocks fixed in size. Each macro-block includes quadrangular picture regions of 16×16 samples in terms of luminance components, and quadrangular sample regions as two chrominance components corresponding to the 16×16 sample regions in connection with luminance components. Each picture can include one or more slices, and each slice is self-inclusive in terms of offering an active sequence and a picture parameter set. Basically a slice representation can be decoded without using information from another slice, and therefore a syntax element can be analyzed on a bit stream and a value of a sample of a picture region. However, to apply a deblocking filter to an entire boundary of a slice for more perfect decoding, some information from other slices is required. Also, it is described in the non-patent document presented by GARY J. SULLIVAN et al. that slices can be used in parallel processing because each slice is encoded and decoded independently of other slices of the picture.

Incidentally, MPEG-2 is standardized as H.262 by ITU (International Telecommunication Union), and authorized as International Standard ISO/IEC 13818-2 by ISO/IEC. Further, MPEG-4 is authorized as International Standard ISO/

IEC 14496-2 by ISO/IEC. Still further, MPEG-4 AVC (Advanced Video Coding) is standardized as H.264 by ITU (International Telecommunication Union), and authorized as International Standard ISO/IEC 14496-10 by ISO/IEC.

SUMMARY

The inventor and others have performed Research and Development on a next-generation international standard moving image encoding scheme prior to the present invention.

On the other hand, as described above, in an encoding process, a frame of video picture, which is I-frame, P-frame or B-frame, is divided into plural small regions referred to as "Macro Block (MB)", and the encoding process is executed on the macro-blocks (MBs) following an order of raster scan for display starting with a macro-block (MB) located at an upper left corner portion of the video picture frame to the right and downward, in turn. In moving image encoding, moving image information is compressed taking advantage of the spatial correlation among macro-blocks (MBs) in a picture frame of a moving image. Specifically, in processing a macro-block (MB), the information of the macro-block (MB) to be processed is predicted from information of its surrounding macro-blocks (i.e. macro-blocks located in the upward direction and in the left in the video picture frame). In the moving image encoding process, only a difference with the predicted information is encoded.

For instance, in MPEG-4 intra encoding, interblock prediction is executed using DC and AC components of a DCT coefficient as pixel information of a block. Further, in interblock prediction according to MPEG-4 AVC(H.264/AVC), interblock prediction is conducted on DC and AC components of pixel values of a block after DCT conversion processing.

Further, in motion prediction for motion vector detection in an encoding process according to MPEG-4 and MPEG-4 AVC(H.264/AVC), a block matching between encoding-target blocks of a frame to be encoded and blocks of a reference frame is performed. In the block matching, a search with a 2-pixel-accuracy motion vector and a search with a 1-pixel-accuracy motion vector are executed on macro-blocks (MBs) surrounding one macro-block of a 4-pixel-accuracy motion vector, which was searched for initially, and thus a final motion vector is detected.

Still further, a deblocking filtering process to reduce the distortion of a block caused during image decoding compliant with the MPEG-4 AVC(H.264/AVC) requires that a filtering process according to a given arithmetic expression be performed on a total of 8 pixels located on the left and right of and bordering a block, and a total of 8 pixels on the upper and lower sides of and bordering the block thereby to rewrite, in total, the 8 pixels on the left and right and the 8 pixels on the upper and lower sides.

On another note, the image sizes of moving images used in television broadcast, video recording and the like tend to keep rising, and an HD (High Definition) size of 1920×1080 pixels has been in the mainstream in recent years. Hence, with regard to future moving image sizes, it is expected that e.g. a 4K×2K size of 4096×2048 pixels and a 8K×4K size of 8192×4096 pixels which can offer very high definition images will come into wide use progressively.

The next-generation moving image encoding scheme on a trend toward larger image sizes like this is required to support very high definition images as described above. On another note, a moving image encoding process and a moving image decoding process both need information of macro-blocks (MBs) surrounding a macro-block (MB) to be processed as described above. Therefore, it is necessary to integrate a built-in memory (on-chip SRAM) for storing surrounding macro-block information into a semiconductor chip of moving image encoding/decoding device including a system large-scale semiconductor integrated circuit (system LSI). In general, a semiconductor chip of moving image encoding/decoding device including a system LSI is connected with an external memory composed of a synchronous dynamic random access memory (SDRAM) or the like. The external memory is arranged so that moving image data before the encoding or decoding process and moving image data after the encoding or decoding process can be stored therein. However, the external memory is too slow in access rate to store surrounding macro-block information. Hence, the surrounding macro-block information is stored in a built-in memory (on-chip SRAM). After the examination, the inventor and others revealed the problem that a built-in memory (on-chip SRAM) has bounds in storage capacity although the amount of information of surrounding macro-blocks which must be stored in a built-in memory (on-chip SRAM) rises with increasing image sizes.

The invention was made as a result of the examination performed by the inventor and others prior to the invention as described above.

Therefore, it is an object of the invention to suppress the increase of the storage capacity of a memory for storing surrounding macro-block information.

The above and other objects of the invention and novel features thereof will become apparent from the description hereof and the accompanying drawings.

Of embodiments herein disclosed, the representative embodiments will be described below in brief.

One representative embodiment of the invention is a moving image encoding method for encoding macro-blocks (MBs) included in a landscape picture frame of a moving image having a larger horizontal width in a horizontal direction in comparison to a vertical width in a vertical direction by use of an encoding device (201).

In encoding the macro-blocks, information of the plural already encoded macro-blocks (MBs) surrounding a macro-block (MB) to be encoded is stored in an information storing memory (204) built in the encoding device.

In encoding the macro-blocks, first an array of vertically aligned the plural macro-blocks (MBs) at the left end of the horizontal width of the landscape picture frame are encoded sequentially, to store encoded information of the array of the plural vertically aligned macro-blocks (MBs) at the left end in the information storing memory (204).

The moving image encoding method is characterized in that after encode of the array of vertically aligned macro-blocks, an adjacent array of the plural vertically aligned macro-blocks (MBs) located horizontally on the right of the left end of the horizontal width of the landscape picture frame are encoded sequentially (see FIGS. 3, 4 and 5).

The effect which the above embodiments bring about is as follows in brief.

According to the invention, the increase in the storage capacity of a memory for storing surrounding macro-blocks' information can be curbed.

DETAILED DESCRIPTION

1. Summary of the Embodiments

Figure 1:
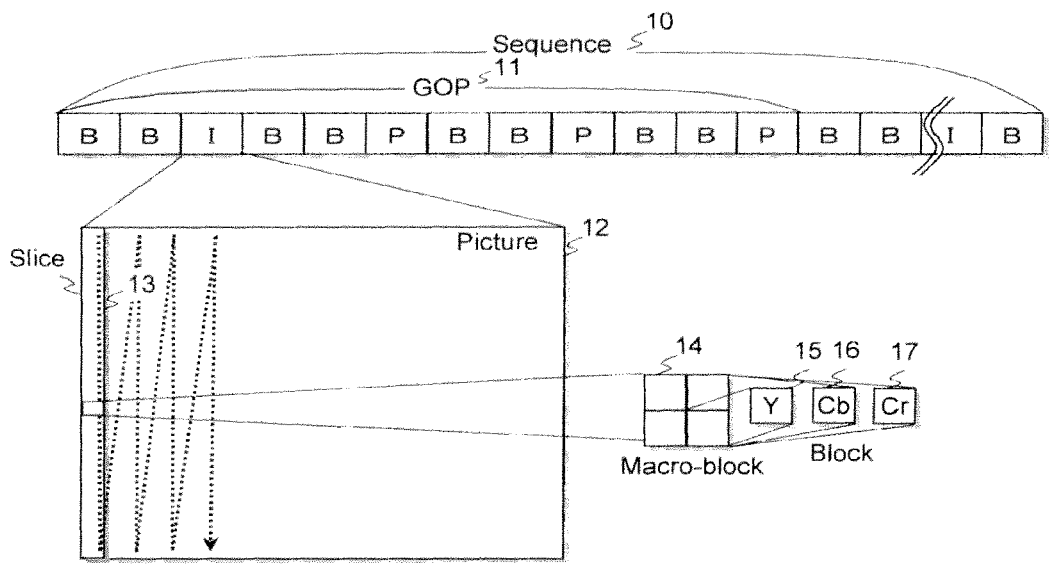
FIG. 1 is a view for explanation of a layered structure of a moving image encoding/decoding scheme according to the first embodiment of the invention.

The representative embodiments of the invention herein disclosed will be outlined first. Here, the reference numerals and character strings for reference to the drawings, which are accompanied with paired round brackets, only exemplify what the concepts of members or components referred to by the numerals or character strings contain.

[1] An embodiment of the invention is a moving image encoding method for encoding the plural macro-blocks (MBs) included in a landscape picture frame of a moving image having a larger horizontal width in a horizontal direction in comparison to a vertical width in a vertical direction by use of an encoding device (201).

In encoding the macro-blocks, information pieces of the plural encoded macro-blocks (MBs) surrounding a macro-block (MB) to be encoded are stored in an information storing memory (204) built in the encoding device.

In the encode of the macro-blocks, first an array of the plural vertically aligned macro-blocks (MBs) at a left end of the horizontal width of the landscape picture frame are encoded sequentially, and consequently encoded information pieces of the array of the plural vertically aligned macro-blocks (MBs) at the left end are stored in the information storing memory (204).

Figure 3:
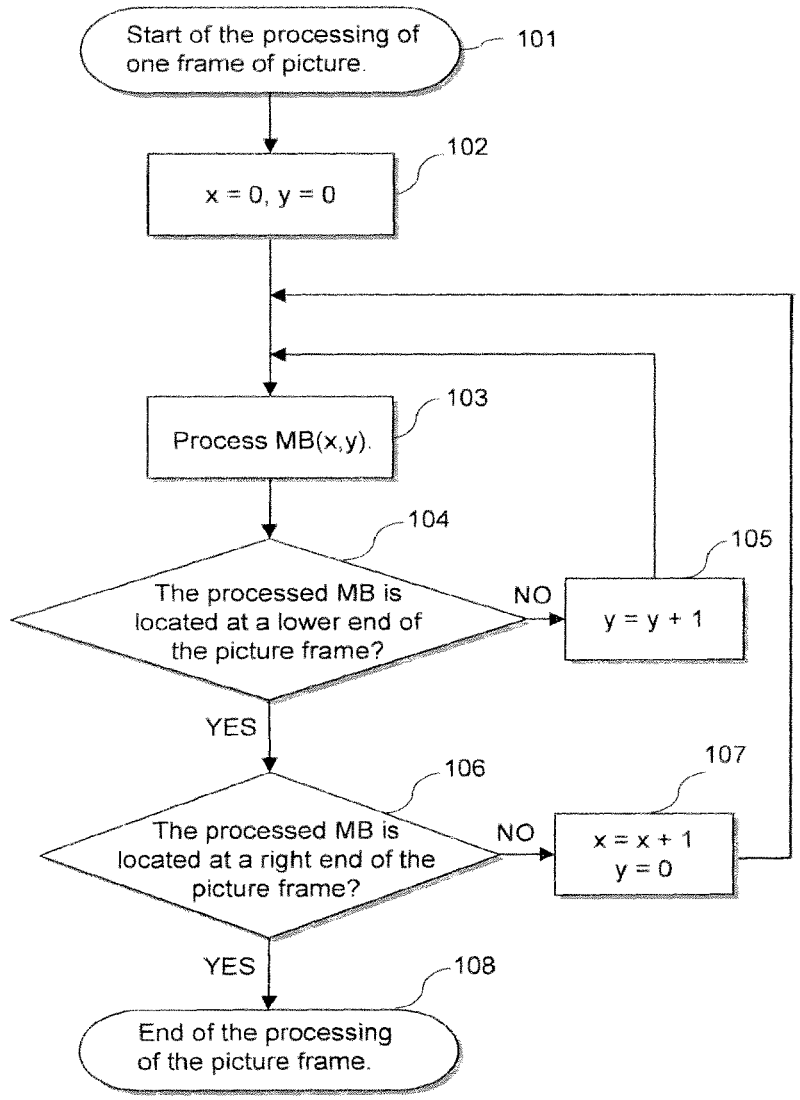
FIG. 3 is a flow chart showing a moving image encoding/decoding procedure according to the first embodiment of the invention.
Figure 4:
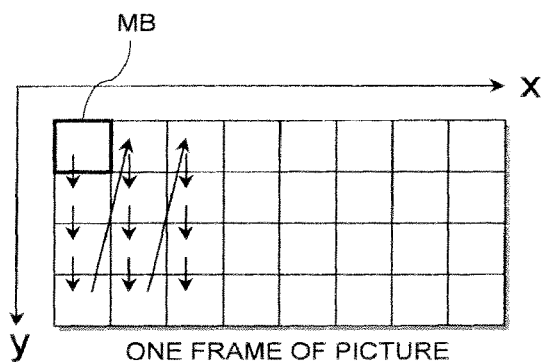
FIG. 4 is a view showing how macro-blocks (MBs) located at a two-dimensional macro-block coordinate (x,y) in a frame of video picture are processed in turn following the moving image encoding/decoding procedure according to the first embodiment of the invention, which was shown by the flow chart of FIG. 3.
Figure 5:
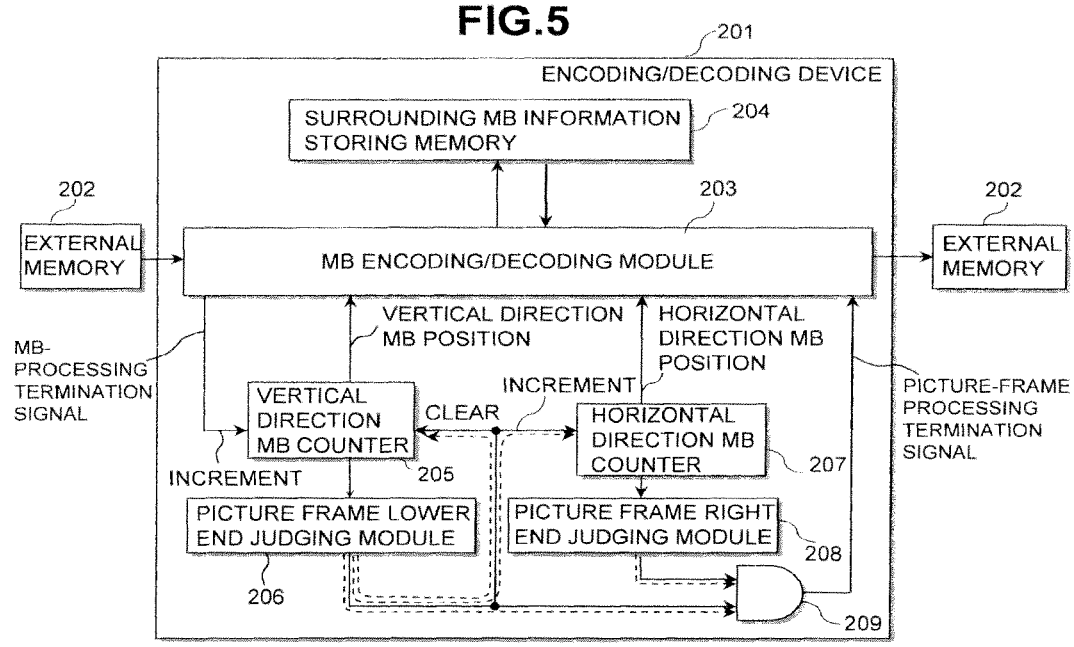
FIG. 5 is a view showing a configuration of the moving image encoding/decoding device according to the first embodiment of the invention, which is operable to execute the moving image encoding/decoding procedure according to the first embodiment of the invention shown by the flow chart of FIG. 3.

After encode of the array of vertically aligned macro-blocks, an adjacent array of the plural vertically aligned macro-blocks (MBs) located horizontally on the right of the left end of the horizontal width of the landscape picture frame are encoded sequentially (see FIGS. 3-5).

According to the embodiment, the increase in the storage capacity of a memory for storing surrounding macro-block information can be curbed.

According to a preferred embodiment, the step of sequentially encoding the adjacent array of the plural vertically aligned macro-blocks (MBs) located horizontally on the right of the left end involves using the encode information pieces of the array of the plural vertically aligned macro-blocks (MBs) at the left end, the encode information pieces stored in the information storing memory (204) (see FIGS. 3-5).

According to another preferred embodiment, the encoding device (201) judges whether or not the encoded macro-block is one of last and first macro-blocks located at lower and upper ends of the vertical width after having encoded each macro-block (MB) in the array of vertically aligned macro-blocks (see FIG. 3, esp. Step 104).

According to a more preferred embodiment, the encoding device (201) judges whether or not the encoded array of plural macro-blocks (MBs) is the last array of macro-blocks located at the right end of the horizontal width after having encoded the adjacent array of the plural vertically aligned macro-blocks (MBs) located horizontally on the right of the left end of the horizontal width of the landscape picture frame (see FIG. 3, esp. Step 106).

According to another more preferred embodiment, in case that the encoding device (201) judges the encoded macro-block not to be any of the last and first macro-blocks located at the lower and upper ends of the vertical width, a count value of a vertical direction counter (205) showing a position of a macro-block to be encoded next in the vertical direction of the left end is incremented by one (see FIG. 3, esp. Step 105).

According to a concrete embodiment, in case that the encoding device (201) judges the encoded array of macro-blocks (MBs) not to be the last array of macro-blocks located at the right end of the horizontal width, a count value of a horizontal direction counter (207) showing a position of an array of macro-blocks to be encoded next in the horizontal direction of the horizontal width of the landscape picture frame is incremented by one (see FIG. 3, esp. Step 107).

[2] In another aspect of the invention, one representative embodiment of the invention is a moving image decoding method for decoding the plural macro-blocks (MBs) included in a landscape picture frame of a moving image having a larger horizontal width in a horizontal direction in comparison to a vertical width in a vertical direction by use of an decoding device (201).

In decoding the macro-blocks, information pieces of the plural decoded macro-blocks (MBs) surrounding a macro-block (MB) to be decoded are stored in an information storing memory (204) built in the decoding device.

In the decode of the macro-blocks, first an array of the plural vertically aligned macro-blocks (MBs) at the left end of the horizontal width of the landscape picture frame are decoded sequentially, and consequently decode information pieces of the array of the plural vertically aligned macro-blocks (MBs) at the left end are stored in the information storing memory (204).

After decode of the array of vertically aligned macro-blocks, an adjacent array of the plural vertically aligned macro-blocks (MBs) located horizontally on the right of the left end of the horizontal width of the landscape picture frame are decoded sequentially (see FIGS. 3, 4 and 5).

According to the above embodiment, the increase in the storage capacity of a memory for storing surrounding macro-block information can be curbed.

According to a preferred embodiment, the step of sequentially decoding the adjacent array of the plural vertically aligned macro-blocks (MBs) located horizontally on the right of the left end involves using the decode information pieces of the array of the plural vertically aligned macro-blocks (MBs) at the left end, the decode information pieces stored in the information storing memory (204) (see FIGS. 3, 4 and 5).

According to another preferred embodiment, the decoding device (201) judges whether or not the decoded macro-block is one of last and first macro-blocks located at lower and upper ends of the vertical width after having decoded each macro-block in the array of vertically aligned macro-blocks (see FIG. 3, esp. Step 104).

According to a more preferred embodiment, the decoding device (201) judges whether or not the decoded array of macro-blocks (MBs) is the last array of macro-blocks located at the right end of the horizontal width after having decoded the adjacent array of the plural vertically aligned macro-blocks (MBs) located horizontally on the right of the left end of the horizontal width of the landscape picture frame (see FIG. 3, esp. Step 106).

According to another more preferred embodiment, in case that the decoding device (201) judges the decoded macro-block not to be any of the last and first macro-blocks located at the lower and upper ends of the vertical width, a count value of a vertical direction counter (205) showing a position of a macro-block to be decoded next in the vertical direction of the left end is incremented by one (see FIG. 3, esp. Step 105).

According to a concrete embodiment, in case that the decoding device (201) judges the decoded array of macro-blocks (MBs) not to be the last array of macro-blocks located at the right end of the horizontal width, a count value of a horizontal direction counter (207) showing a position of an array of macro-blocks to be decoded next in the horizontal direction of the horizontal width of the landscape picture frame is incremented by one (see FIG. 3, esp. Step 107).

[3] One representative embodiment of the invention is a moving image encoding device (201) for encoding the plural macro-blocks (MBs) included in a landscape picture frame of a moving image having a larger horizontal width in a horizontal direction in comparison to a vertical width in a vertical direction, which includes an encoding module (203) and an information storing memory (204).

In encoding the macro-blocks by the encoding module (203), information pieces of macro-blocks (MBs) already encoded and surrounding a macro-block (MB) to be encoded are stored in the information storing memory (204).

In the encode of macro-blocks, first the encoding module (203) sequentially encodes the array of vertically aligned macro-blocks (MBs) at the left end of the horizontal width of the landscape picture frame and consequently, the encoding module (203) stores encode information pieces of the array of the plural vertically aligned macro-blocks (MBs) at the left end in the information storing memory (204).

After having encoded the array of vertically aligned macro-blocks, subsequently the encoding module (203) sequentially encodes an adjacent array of the plural vertically aligned macro-blocks (MBs) located horizontally on the right of the left end of the horizontal width of the landscape picture frame (see FIGS. 3, 4 and 5).

According to the above embodiment, the increase of the storage capacity of a memory for storing surrounding macro-block information can be curbed.

According to a preferred embodiment, the step of sequentially encoding the adjacent array of the plural vertically aligned macro-blocks (MBs) located horizontally on the right of the left end by use of the encoding module (203) involves using the encode information pieces of the array of vertically aligned macro-blocks (MBs) at the left end, the encode information pieces stored in the information storing memory (204) (see FIGS. 3, 4 and 5).

According to another preferred embodiment, the moving image encoding device (201) judges whether or not the encoded macro-block is one of last and first macro-blocks located at lower and upper ends of the vertical width after having encoded each macro-block (MB) in the array of vertically aligned macro-blocks (see FIG. 3, esp. Step 104).

According to still another preferred embodiment, the moving image encoding device (201) judges whether or not the encoded array of macro-blocks (MBs) is the last array of macro-blocks located at the right end of the horizontal width after having encoded the adjacent array of the plural vertically aligned macro-blocks (MBs) located horizontally on the right of the left end of the horizontal width of the landscape picture frame (see FIG. 3, esp. Step 106).

According to still another preferred embodiment, the moving image encoding device (201) further includes a vertical direction counter (205) showing a position of a macro-block to be encoded next in the vertical direction (see FIG. 5)

In case that the moving image encoding device (201) judges the encoded macro-block not to be any of the last and first macro-blocks located at the lower and upper ends of the vertical width, a count value of the vertical direction counter (205) is incremented by one (see FIG. 3, esp. Step 105).

According to another preferred embodiment, the moving image encoding device (201) further includes a horizontal direction counter (207) showing a position of an array of macro-blocks to be encoded next in the horizontal direction (see FIG. 5).

However, in case that the moving image encoding device (201) judges the encoded array of macro-blocks (MBs) not to be the last array of macro-blocks located at the right end of the horizontal width, a count value of the horizontal direction counter (207) is incremented by one (see FIG. 3, esp. Step 107).

According to a more preferred embodiment, the moving image encoding device (201) is arranged to be connectable with an image memory (702, 902 and 1302) in which the macro-blocks included in the landscape picture frame of the moving image can be stored.

In the moving image encoding device (201), after an array of horizontally aligned macro-blocks (1, 2, 3, 4) at the upper end of the vertical width of the landscape picture frame have been stored in the image memory, an adjacent array of horizontally aligned macro-blocks located vertically below the upper end of the vertical width of the landscape picture frame can be stored in the image memory (5, 6, 7, 8) (see FIGS. 13 to 15).

According to another more preferred embodiment, the moving image encoding device (701) further includes an image-rotation module (703) which reads out the landscape picture frame from the image memory, rotates the image of the picture frame by 90° to produce a rotation image, and writes the rotation image into the image memory. In the moving image encoding device, the rotation image stored in the image memory can be read out and supplied to the encoding module (704) (see FIG. 13).

According to another more preferred embodiment, the moving image encoding device (201) further includes an image memory interface (903, 906, 1303, 1306 and 1309) which can be connected with the image memory.

The image memory interface serves to: read out, from the image memory, the array of macro-blocks (9, 5, 1) vertically aligned and located at the left end of the horizontal width of the landscape picture frame to supply the read array of macro-blocks to the encoding module (904, 1304); and subsequently read out an adjacent array of macro-blocks (10, 6, 2) vertically aligned horizontally on the right of the left end of the horizontal width of the landscape picture frame to supply the read array of macro-blocks to the encoding module (904, 1304) (see FIGS. 14 and 15).

According to another more preferred embodiment, the moving image encoding device further includes an image read address generating module (906, 1306) which serves to: read out, from the image memory, the array of macro-blocks (9, 5, 1) vertically aligned at the left end of the horizontal width of the landscape picture frame to supply the read array of macro-blocks to the encoding module (904, 1304); and subsequently read out an adjacent array of macro-blocks (10, 6, 2) vertically aligned horizontally on the right of the left end of the horizontal width of the landscape picture frame to supply the read array of macro-blocks to the encoding module (904, 1304) (see FIGS. 14 and 15).

Figure 14:
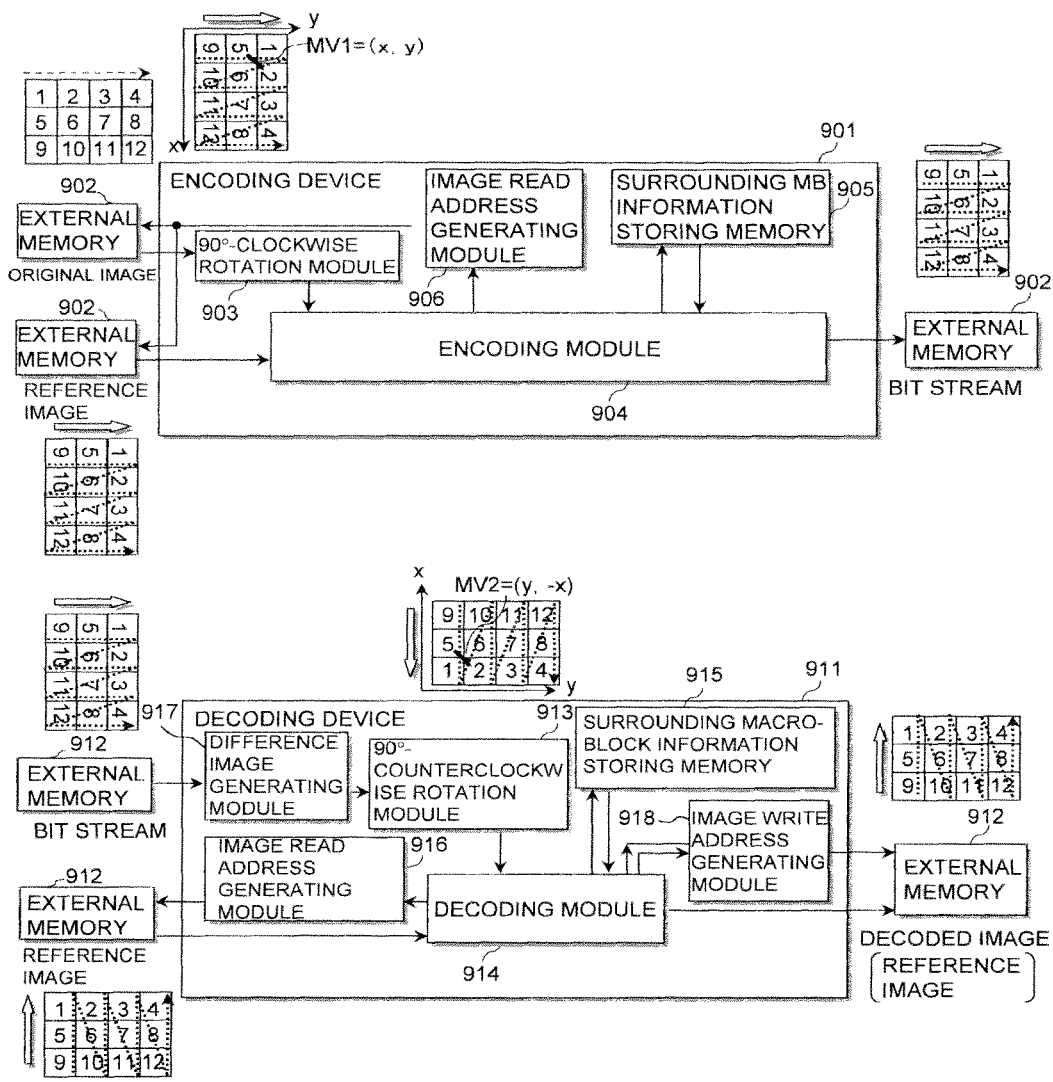
FIG. 14 is a view showing a configuration of a moving image encoding/decoding device according to the third embodiment of the invention.
Figure 15:
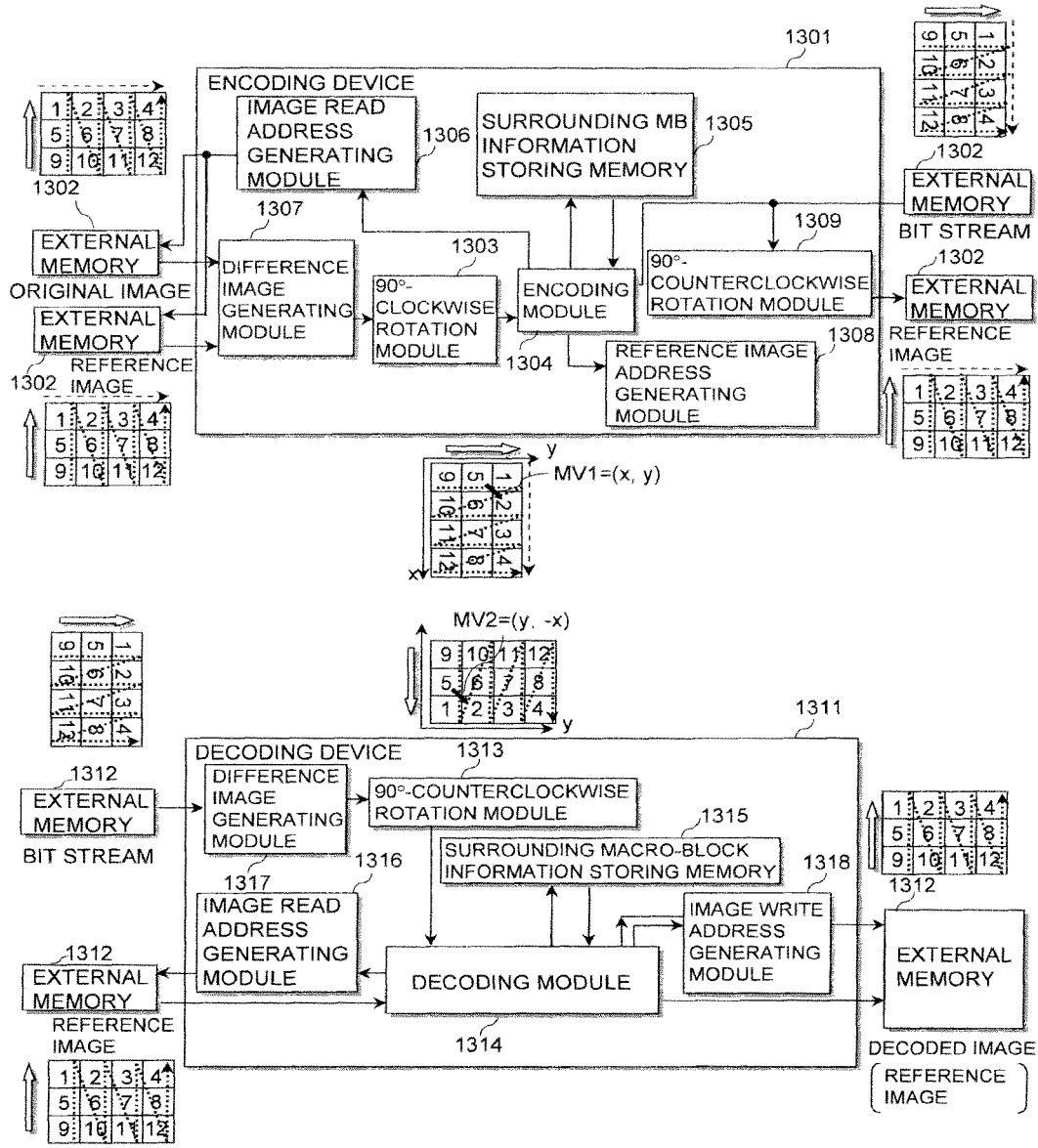
FIG. 15 is a view showing a configuration of a moving image encoding/decoding device according to the fourth embodiment of the invention.

According to a concrete embodiment, the moving image encoding device further includes an image-rotation module (903, 1303) which serves to produce a rotation image by rotating by about 90° each macro-block in the array of macro-blocks read out from the image memory according to an address generated by the image read address generating module and to supply the rotation image to the encoding module (see FIGS. 14 and 15).

Figure 16:
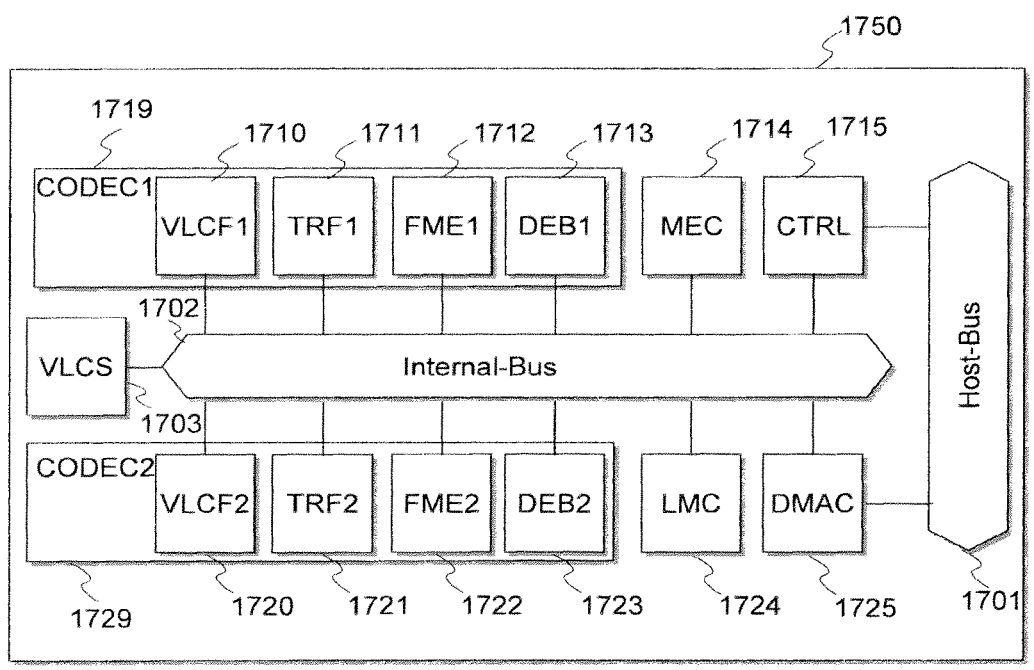
FIG. 16 is a view showing a structure of a moving image processing device 1750 according to the fifth embodiment of the invention, which can be used as any device or module of (1) the macro-block encoding/decoding module 203 of the moving image encoding/decoding device 201 according to the first embodiment of the invention shown in FIG. 5, (2) the encoding module 704 of the encoding device 701 and (3) the decoding module 714 of the decoding device 711 according to the second embodiment of the invention shown in FIG. 13, (4) the encoding module 904 of the encoding device 901, and (5) the decoding module 1914 of the decoding device 1911 according to the third embodiment of the invention shown in FIG. 14, and (6) the encoding module 1304 of the encoding device 1301 and (7) the decoding module 1914 of the decoding device 1311 according to the fourth embodiment of the invention shown in FIG. 15.

In the moving image encoding device according to the most concrete embodiment, the encoding module (704, 904, 1304) includes operation functions of a variable length encoding module, an orthogonal transforming device/quantizer, and a motion prediction module (see FIG. 16).

[4] One representative embodiment of the invention is a moving image decoding device (201) for decoding macro-blocks (MBs) included in a landscape picture frame of a moving image having a larger horizontal width in a horizontal direction in comparison to a vertical width in a vertical direction, which includes a decoding module (203) and an information storing memory (204).

In decoding the macro-blocks by the decoding module (203), information pieces of plural macro-blocks (MBs) already decoded and surrounding a macro-block (MB) to be decoded are stored in the information storing memory (204).

In the decode of the macro-blocks, first the decoding module (203) sequentially decodes an array of the plural vertically aligned macro-blocks (MBs) at a left end of the horizontal width of the landscape picture frame to store, in the information storing memory (204), decode information pieces of the array of the plural vertically aligned macro-blocks (MBs) at the left end.

Subsequently, after having decoded the array of vertically aligned macro-blocks, the decoding module (203) sequentially decodes an adjacent array of the plural vertically aligned macro-blocks (MBs) located horizontally on the right of the left end of the horizontal width of the landscape picture frame (see FIGS. 3, 4 and 5).

According to the above embodiment, the increase in the storage capacity of a memory for storing surrounding macro-block information can be curbed.

According to a preferred embodiment, the step of sequentially decoding the adjacent array of the plural vertically aligned macro-blocks (MBs) located horizontally on the right of the left end by use of the decoding module (203) involves using the decode information pieces of the array of vertically aligned macro-blocks at the left end, the decode information pieces stored in the information storing memory (204) (see FIGS. 3, 4 and 5).

According to another preferred embodiment, the moving image decoding device (201) judges whether or not the decoded macro-block is one of last and first macro-blocks located at lower and upper ends of the vertical width after having decoded each macro-block (MB) in the array of vertically aligned macro-blocks (see FIG. 3, esp. Step 104).

According to still another preferred embodiment, the moving image decoding device (201) judges whether or not the decoded array of macro-blocks (MBs) is the last array of macro-blocks located at the right end of the horizontal width after having decoded the adjacent array of the plural vertically aligned macro-blocks (MBs) located horizontally on the right of the left end of the horizontal width of the landscape picture frame (see FIG. 3, esp. Step 106).

According to still another preferred embodiment, the moving image decoding device (201) further includes a vertical direction counter (205) showing a position of a macro-block to be decoded next in the vertical direction (see FIG. 5).

In case that the moving image decoding device (201) judges the decoded macro-block not to be any of the last and first macro-blocks located at the lower and upper ends of the vertical width, a count value of the vertical direction counter (205) is incremented by one (see FIG. 3, esp. Step 105).

According to another preferred embodiment, the moving image decoding device (201) further includes a horizontal direction counter (207) showing a position of an array of macro-blocks to be decoded next in the horizontal direction (see FIG. 5).

In case that the moving image decoding device (201) judges the decoded array of macro-blocks (MBs) not to be the last array of macro-blocks located at the right end of the horizontal width, a count value of the horizontal direction counter (207) is incremented by one (see FIG. 3, esp. Step 107).

According to another preferred embodiment, the moving image decoding device (711, 911, 1311) is connectable with an image memory (712, 912, 1312) in which the macro-blocks can be stored, and which can be connected to the moving image decoding device.

Figure 13:
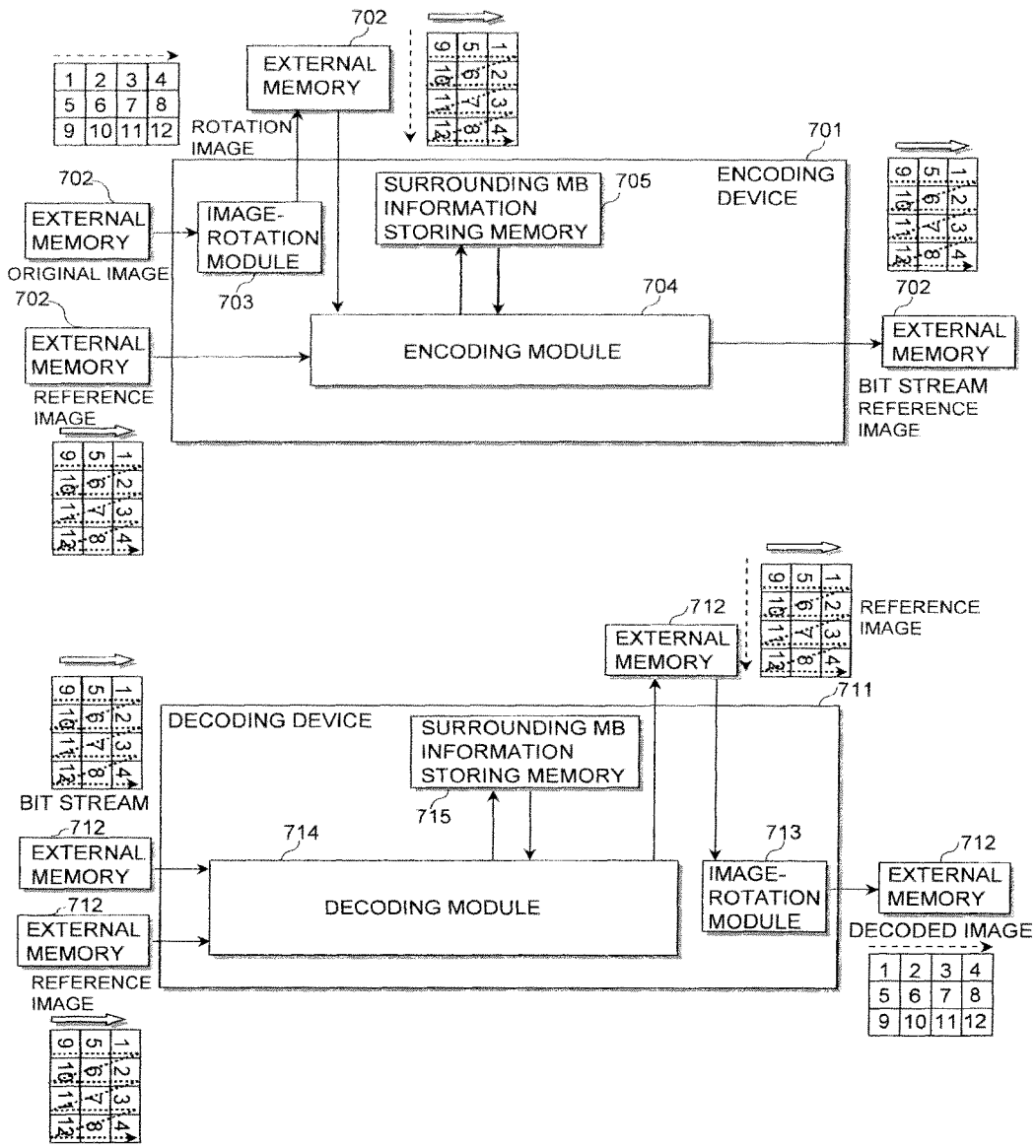
FIG. 13 is a view showing a configuration of a moving image encoding/decoding device according to the second embodiment of the invention.

According to a preferred embodiment, the moving image encoding device (711) further includes an image-rotation module (713) which reads out the landscape picture frame from the image memory, rotates the image of the picture frame by 90° to produce a rotation image, and writes the rotation image into the image memory (see FIG. 13).

According to a more preferred embodiment, the moving image encoding device (911, 1311) further includes an external interface (913, 916, 918, 1313, 1316, 1318) to which moving image encode signals can be supplied.

The external interface serves to supply the decoding module (914, 1314) with an array of macro-blocks (9, 5, 1) vertically aligned at the left end of the horizontal width of the landscape picture frame included in the moving image encode signals, and to subsequently supply the decoding module with the array of macro-blocks (10, 6, 2) vertically aligned horizontally on the right of the left end of the horizontal width of the landscape picture frame included in the moving image encode signals.

The moving image decoding device decodes the array of vertically aligned macro-blocks at the left end of the horizontal width of the landscape picture frame included in the moving image encode signals supplied from the external interface, and subsequently decodes the adjacent array of vertically aligned macro-blocks located horizontally on the right of the left end of the horizontal width of the landscape picture frame included in the moving image encode signals supplied from the external interface.

The moving image decoding device is connectable with an image memory (912, 1312) in which information pieces of a decoded moving image having a larger horizontal width in a horizontal direction in comparison to a vertical width in a vertical direction can be stored, and which can be connected with the moving image decoding device.

The moving image decoding device stores, in a first memory region (9, 5, 1) of the image memory, decode processing information pieces of the array of vertically aligned macro-blocks at the left end of the horizontal width of the landscape picture frame, and subsequently stores, in a second memory region (10, 6, 2) of the image memory, decode processing information pieces of the array of vertically aligned macro-blocks located horizontally on the right of the left end of the horizontal width of the landscape picture frame included in the moving image encode signals.

The first and second memory regions of the image memory correspond to information of an array of images vertically aligned at a left end of the display horizontal width of a landscape moving image display picture frame having a larger display horizontal width in the horizontal direction in comparison to a display vertical width in a vertical direction, and information of images vertically aligned on the horizontally immediate right of images at the left end of the display horizontal width, respectively (see FIGS. 14 and 15).

According to another more preferred embodiment, the moving image decoding device further includes an image write address generating module (918, 1318) which serves: to store decode processing information pieces of the array of vertically aligned macro-blocks at the left end of the horizontal width of the landscape picture frame in the first memory region of the image memory; and subsequently, to store in the second memory region of the image memory, decode processing information pieces of the adjacent array of vertically aligned macro-blocks located horizontally on the right of the left end of the horizontal width of the landscape picture frame, the decode processing information pieces included in the moving image encode signals (see FIGS. 14 and 15).

According to a concrete embodiment, the external interface rotates an array of macro-blocks included in the moving image encode signals by about 90° thereby to produce a rotation image, and supplies the decoding module with the rotation image (see FIGS. 14 and 15).

In the moving image decoding device according to the most concrete embodiment, the decoding module (714, 914, 1314) includes operation functions of a variable length decoding module, an inverse quantizer/inverse orthogonal transforming device, and a motion compensation module (see FIG. 16).

2. Further Detailed Description of the Embodiments

Next, the embodiments will be described further in detail. It is noted that as to all the drawings, to which reference is made for describing the best mode for carrying out the invention, parts or components having the same function are identified by the same reference numeral or character string, and the repetition of the description thereof is avoided.

First Embodiment

<<Layered Structure in Moving Image Encoding/Decoding Scheme>>

FIG. 1 is a view for explanation of a layered structure in a moving image encoding/decoding scheme according to the first embodiment of the invention.

As shown in FIG. 1, a moving image encoding scheme according to the first embodiment of the invention has a six-level-layered structure which includes Sequence 10 corresponding to an entire moving image to Blocks 15, 16 and 17, each making a unit of processing of DCT (Discrete Cosine Transform). Specifically, the first level includes Sequence 10, the second level includes Group of Pictures (GOP) 11, the third level includes Pictures 12, the fourth level includes Slices 13, the fifth level includes Macro-blocks 14, and the sixth level includes Blocks 15, 16 and 17. The number of Pictures 12 included in Group of Pictures (GOP) 11, and the number of Macro-blocks 14 included in Slice 13 are both relatively flexible.

As shown in FIG. 1, the picture frame vertical width of a moving image of Pictures 12 of the third level is shorter than the horizontal width thereof, and the picture frames are elongated laterally. In the conventional MPEG-2 moving image encoding/decoding scheme, Slices 13 of the fourth level are disposed along a horizontal width direction of Picture 12 of the third level, and Macro-blocks (MBs) 14 of the fifth level are also disposed along the horizontal width direction, and the encoding or decoding process is performed in the horizontal width direction inside Slice 13 of the fourth level in turn. In contrast, in the moving image encoding scheme according to the first embodiment of the invention, Slices 13 of the fourth level are disposed in a vertical width direction of Picture 12 of the third level, Macro-blocks (MBs) 14 of the fifth level are also disposed in the vertical width direction, and the encoding or decoding process is performed in turn in the vertical width direction inside Slice 13 of the fourth level as shown by a dotted arrow.

<<Structure of Encode Video Stream>>

Figure 2:
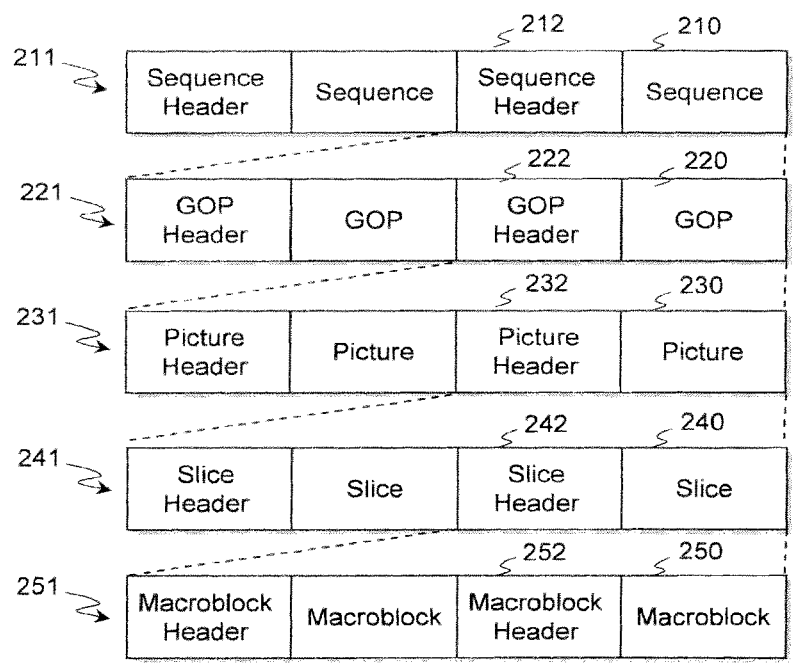
FIG. 2 is a view showing a structure of an encode video stream already encoded by the moving image encoding scheme according to the first embodiment of the invention shown with reference to FIG. 1.

FIG. 2 is a view showing a structure of an encode video stream already encoded by the moving image encoding scheme according to the first embodiment of the invention shown with reference to FIG. 1.

The video stream shown in FIG. 2 is layered, and composed of a stack of layers of different levels, i.e. a sequence level 211, a Group-of-Pictures (GOP) level 221, a picture level 231, a slice level 241 and a macro-block (MB) level 251. Therefore, the levels below make parts of the preceding levels. The sequence level 211 includes successive Sequences, and each Sequence includes plural Group-of-Pictures (GOP) groups. The groups of Group-of-Pictures (GOP) level 221 are composed of successive groups of Pictures, and each GOP includes one or a number of Pictures. The picture level 231 includes successive Pictures (I, P and B frames), and each Picture 230 includes one or a number of Slices 240. The slice level 242 includes successive Slices 240, and each Slice 240 includes one or a number of Macro-blocks 250. The macro-block (MB) level 251 includes successive Macro-blocks.

To decode a video stream as shown in FIG. 2, reliable information concerning the video stream is needed. Such information is often put in a header which the video stream includes. Therefore, each Block of data of each level of a video stream generally has a header including relevant information involved in the encoding and decoding of a video stream. For instance, Sequence 210 has a sequence header 212 in the sequence level 211; GOP 220 has a GOP header 222 in the GOP level 221; Picture 230 has a picture header 232 in the picture level 231; Slice 240 has a slice header 242 in the slice level 241; and Macro-block (MB) 250 has a macro-block (MB) header 252 in the MB level 251.

The sequence header 212 includes information pieces of e.g. the width of Picture 12 referred to as "horizontal size (horizontal_size)", the height of Picture 12 referred to as "vertical size (vertical_size)", the aspect ratio of a pixel referred to as "aspect ratio information (aspect_ratio_information)".

The GOP header 222 includes information pieces of a parameter referred to as "time code (time_code)", and parameters for describing a GOP structure, which are referred to as "closed GOP (closed_gop)" and "broken link (broken_link)".

The picture header 232 includes an information piece such as a parameter referred to as "picture coding type (picture_coding_type)" and showing what type of picture of I-picture, P-picture and B-picture the picture is. The picture header 232 further includes a parameter referred to as "f code (f_code)" and showing which type of picture the motion vector was encoded from.

The slice header 242 includes information pieces, such as a slice start code (slice_start_code) showing the start of the slice, and a set of parameters showing the vertical position and horizontal position of the first macro-block (MB) of the slice.

The macro-block (MB) header 252 includes information pieces such as the address and type of the macro-block, whether or not the macro-block 250 includes a motion vector and a type of motion vector (forward or backward), and a quantizer scale which is specified for each macro-block. Further, the macro-block (MB) header 252 decides a type of Discrete Cosine Transform (DCT), DCT coefficients, etc.

<<Procedure of Moving Image Encoding/Decoding Process>>

FIG. 3 is a flow chart showing a moving image encoding/decoding procedure according to the first embodiment of the invention.

The syntax of bit streams (the rule for compressed and encoded data strings, or the method for forming a bit stream of encoded data) according to the moving image encoding scheme involved with the first embodiment of the invention shown in FIG. 3 is based on the rule described with reference to FIGS. 1 and 2.

Prior to Step 101 of FIG. 3, a moving image encoding/decoding device operable to execute a moving image encoding/decoding process according to the first embodiment of the invention analyzes the above-described syntax thereby to decide whether to execute the moving image encoding/decoding process obeying the syntax according to the first embodiment of the invention.

After the decision, as shown in FIG. 3, the moving image encoding or decoding process on a frame of video picture (Picture 12) is started in Step 101. In Step 102, the coordinate (x,y) of a macro-block (MB) is initialized and set to the origin point (0,0). In Step 103, a macro-block (MB) located at the coordinate (x,y) of the macro-block is encoded or decoded. In Step 104, it is judged whether or not the macro-block (MB) processed in Step 103 is located at a lower end of the picture frame. In case that the processed macro-block (MB) is judged not to be at the lower end of the picture frame in Step 104, the vertical direction's variable y of the coordinate (x,y) of the macro-block is incremented by one in Step 105. After that, the encoding or decoding process on a macro-block (MB) of Step 103 is conducted again. However, in case that the processed macro-block (MB) is judged to be at the lower end of the picture frame in Step 104, it is judged in Step 106 whether or not the processed macro-block (MB) is located at a right end of the picture frame. In case that the processed macro-block (MB) is judged not to be at the right end of the picture frame in Step 106, the lateral direction's variable x of the coordinate (x,y) of the macro-block is incremented by one, and the variable y of the vertical direction is reset to an initial value of zero (0) in Step 107. After that, the encoding or decoding process on a macro-block (MB) of Step 103 is conducted again. In contrast, in case that the processed macro-block (MB) is judged to be at the right end of the picture frame in Step 106, the moving image encoding/decoding process on the video picture is terminated in Step 108.

FIG. 4 is a view showing how macro-blocks (MBs) located at two-dimensional macro-block coordinates (x,y) in a frame of video picture are processed in turn following the moving image encoding/decoding procedure according to the first embodiment of the invention shown by the flow chart of FIG. 3.

As shown in FIG. 4, the execution of the process is started from a macro-block (MB) located at the upper left corner portion of the video picture frame. The direction to first shift the execution of the process is not the right-hand direction of the picture frame following the order of raster scan for display, but the vertically downward direction of the picture frame. The moving image encoding/decoding device continues executing the processing on the macro-blocks while changing an object of the execution of the processing in the vertically downward direction of the picture frame. After having finished the processing on the macro-block (MB) located at the lower end of the video picture frame, the image encoding/decoding device changes an object of the execution of the processing to, of an adjacent row of macro-blocks (MBs) on the right side, the macro-block (MB) located at the upper end of the row (repeats the same processing). The direction of the execution of the processing on the macro-blocks of the adjacent row is also the vertically downward direction of the picture frame.

<<Structure of the Moving Image Encoding/Decoding Device>>

FIG. 5 is a view showing a configuration of the moving image encoding/decoding device according to the first embodiment of the invention, which is operable to execute the moving image encoding/decoding procedure according to the first embodiment of the invention shown by the flow chart of FIG. 3.

As shown in FIG. 5, the moving image encoding/decoding device 201 including a system LSI is connected with an external memory 202 composed of a synchronous dynamic random access memory. The semiconductor chip of the moving image encoding/decoding device 201 includes: a macro-block encoding/decoding module 203; a surrounding macro-block information storing memory 204; a vertical direction macro-block counter 205; a picture frame lower end judging module 206; a horizontal direction macro-block counter 207; a picture frame right end judging module 208; and an AND logical gate circuit 209.

In the moving image encoding process, the moving image encoding/decoding device 201 uses an original image and a reference image stored in the external memory 202 to execute the moving image encoding process, and then outputs a moving image encoded bit stream and a reference image to the external memory 202. In the moving image decoding process, the moving image encoding/decoding device 201 uses the moving image encoded bit stream and the reference image stored in the external memory 202 to execute the moving image decoding process, and then outputs the decoded moving image to the external memory 202.

The macro-block encoding/decoding module 203 executes an encoding process or a decoding process on a macro-block (MB) located at a set of macro-block coordinates indicated by the vertical direction macro-block counter 205 and the horizontal direction macro-block counter 207.

In the surrounding macro-block information storing memory 204, information pieces of macro-blocks (MBs) in the vertically downward direction (vertical direction) of a picture frame output by the macro-block encoding/decoding module 203 are stored. The macro-block encoding/decoding module 203 reads out the information of macro-blocks (MBs) of the left-side array from the surrounding macro-block information storing memory 204, and executes an encoding process or a decoding process. The count value of the vertical direction macro-block counter 205 is incremented by one by a macro-block-processing termination signal output by the macro-block encoding/decoding module 203. A vertical direction macro-block position signal which is an output signal of the vertical direction macro-block counter 205 is supplied to the picture frame lower end judging module 206. In the case of the macro-block position judged to be the picture frame lower end as a result of judgment on the macro-block position by the picture frame lower end judging module 206, the vertical direction macro-block counter 205 is cleared or reset to its initial value (0), and the count value of the horizontal direction macro-block counter 207 is incremented by one. A horizontal direction macro-block position signal which is an output signal of the horizontal direction macro-block counter 207 is supplied to the picture frame right end judging module 208. In the case of the macro-block position judged to be the picture frame right end as a result of judgment on the macro-block position by the picture frame right end judging module 208, and concurrently judged to be the picture frame lower end as a result of judgment on the macro-block position by the picture frame lower end judging module 206, the AND logical gate circuit 209 is supplied with the result of judgment by the picture frame lower end judging module 206, and the result of judgment by the picture frame right end judging module 208. Accordingly, a picture-frame-processing termination signal of High ("1") level arising from an output of the AND logical gate circuit 209 is supplied to the macro-block encoding/decoding module 203.

<<Data Array of Moving Image Encoded Bit Stream>>

Figure 6:
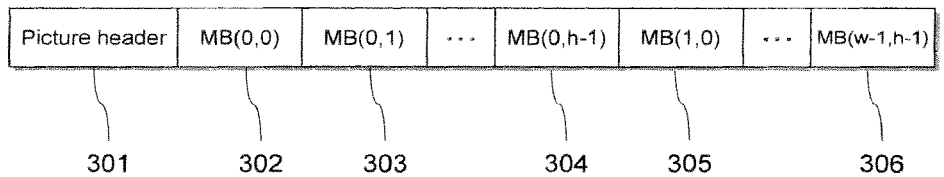
FIG. 6 is a view showing a data array of moving image encoded bit stream which the moving image encoding/decoding device according to the first embodiment of the invention shown in FIG. 5 is supplied with in case that working as a decoding device.

FIG. 6 is a view showing a data array of moving image encoded bit stream which the moving image encoding/decoding device according to the first embodiment of the invention shown in FIG. 5 is supplied with in case that working as a decoding device.

As shown in FIG. 6, the data array of moving image encoded bit stream has a picture header 301, and an encoded information piece 302 of the macro-block (MB(0,0)) at the upper left corner portion of the picture frame of MB coordinates (0,0), which is placed just behind the picture header 301. Subsequent to the encoded MB(0, 0) information piece, an encoded information piece 303 of the macro-block (MB(0,1)) at the MB coordinates (0,1) in the vertically downward direction follows, and thereafter encoded information pieces of macro-blocks (MB) located after the macro-block (MB(0,1)) in the vertically downward direction follow in turn. After an encoded information piece 304 of the macro-block (MB(0,h−1)) at MB coordinates (0,h−1) of the picture frame lower left end, an encoded information piece 305 of the macro-block (MB(1,0)) at the MB coordinates (1,0) in the second row from the left of the picture frame follows. After that, encoded information pieces of subsequent macro-blocks are aligned likewise until reaching the macro-block (MB(w−1, h−1)) at the MB coordinates (w−1, h−1) of the picture frame lower right end. The picture header 301 shown in FIG. 6 actually includes a sequence header 212, a GOP header 222, a picture header 232, a slice header 242 and a macro-block (MB) header 252 as shown in FIG. 2. As a result, it becomes possible to decide whether to execute the moving image encoding/decoding process obeying the syntax according to the first embodiment of the invention by analyzing the picture header 301 shown in FIG. 6. In addition, by analyzing the width of Picture 12 included in the sequence header 212 shown in FIG. 2 and referred to as "horizontal size", and the height of Picture 12 referred to as "vertical size", it becomes possible to recognize the picture frame lower end on which a judgment is made in Step 104 of the process procedure shown in FIG. 3, and the picture frame right end on which a judgment is made in Step 106.

<<Surrounding Macro-Block>>

Figure 7:
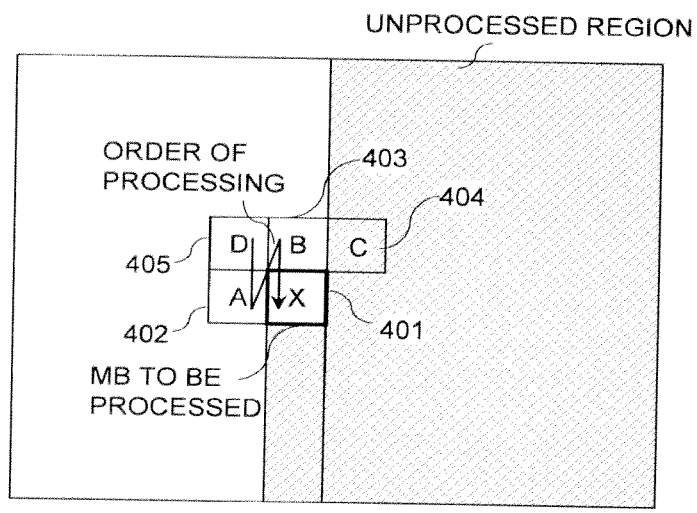
FIG. 7 is a view showing the relation between a macro-block (MB) 401 to be processed, and four surrounding macro-blocks (MBs) 402-405 used for prediction of the macro-block (MB) 401 in the case of executing a conventional encoding process which is different from the encoding process according to the invention.

FIG. 7 is a view showing the relation between a macro-block (MB) 401 to be processed, and four surrounding macro-blocks (MBs) 402-405 used for prediction of the macro-block (MB) 401 in the case of executing a conventional encoding process which is different from the encoding process according to the invention.

Figure 8:
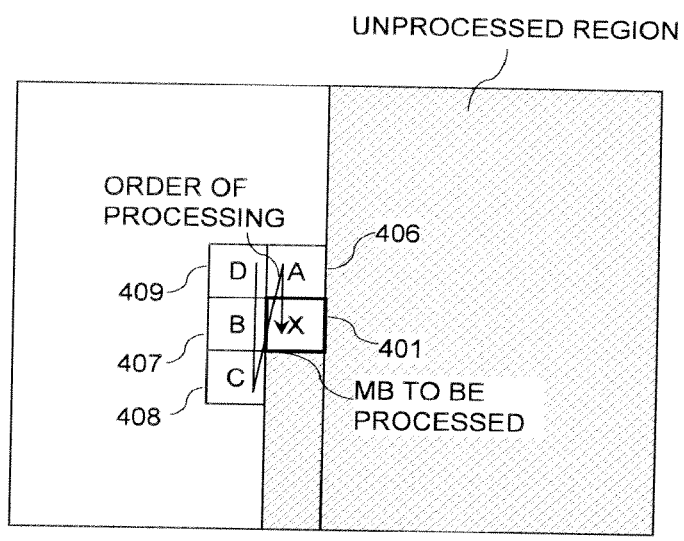
FIG. 8 is a view showing the relation between the macro-block (MB) 401 to be processed, and four surrounding macro-blocks (MBs) 406-409 used for prediction of the macro-block (MB) 401 in the case of executing the procedure of the moving image encoding/decoding process according to the first embodiment of the invention as described with reference to FIGS. 1 to 6.

FIG. 8 is a view showing the relation between the macro-block (MB) 401 to be processed, and four surrounding macro-blocks (MBs) 406-409 used for prediction of the macro-block (MB) 401 in the case of executing the procedure of the moving image encoding/decoding process according to the first embodiment of the invention as described with reference to FIGS. 1 to 6.

In the case shown by FIG. 7, the macro-block (MB) 401 to be processed must be processed with the macro-block (MB) 404 at the upper right of the macro-block (MB) 401 remaining unprocessed and therefore, the accuracy of prediction is deteriorated because of a reduced amount of reference information. In contrast, in the case shown by FIG. 8 according to the first embodiment of the invention, all the four surrounding macro-blocks (MB) 406-409 have been processed at the time of processing the macro-block (MB) 401 to be processed, and therefore the deterioration of the prediction accuracy owing to a reduced amount of reference information can be avoided.

<<Memory for Storing Surrounding Macro-Block Information>>

Figure 9:
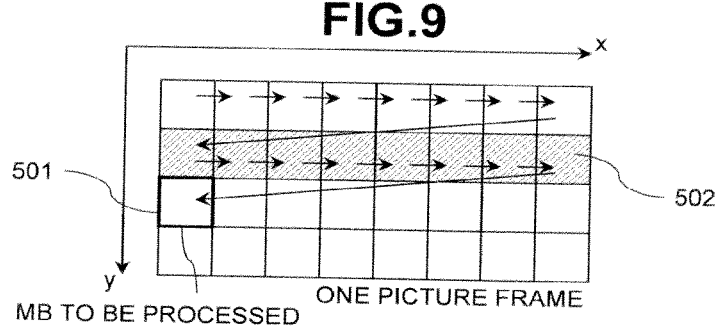
FIG. 9 is a view showing how macro-blocks (MBs) of a frame of video picture are encoded sequentially following a conventional encoding process, in which the object of the encoding process is first shifted from the macro-block (MB) at the upper left portion of the picture frame toward the right in turn until reaching the macro-block at the right end thereof, and then changed downward, following the order of raster-scan for display.

FIG. 9 is a view showing how macro-blocks (MBs) of a frame of video picture are encoded sequentially following a conventional encoding process, in which the object of the encoding process is first shifted from the macro-block (MB) at the upper left portion of the picture frame toward the right in turn until reaching the macro-block at the right end thereof, and then changed downward, following the order of raster-scan for display.

The conventional encoding process described with reference to FIG. 9 requires a memory for storing surrounding macro-block information to have a storage capacity large enough to store the information 520 of macro-blocks (MBs) containing the horizontal width of a picture frame.

Figure 10:
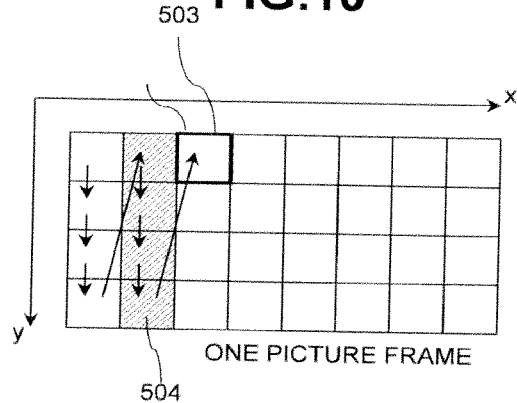
FIG. 10 is a view showing how macro-blocks (MBs) of a frame of video picture are encoded sequentially following the encoding process according to the first embodiment of the invention as described with reference to FIGS. 1 to 6, in which the object of the encoding process is first shifted from the macro-block (MB) located at the upper left portion of the picture frame downward until reaching the macro-block at the lower end thereof, and then changed to the right.

FIG. 10 is a view showing how macro-blocks (MBs) of a frame of video picture are encoded sequentially following the encoding process according to the first embodiment of the invention as described with reference to FIGS. 1 to 6, in which the object of the encoding process is first shifted from the macro-block (MB) located at the upper left portion of the picture frame downward until reaching the macro-block at the lower end thereof, and then changed to the right.

With the encoding process according to the first embodiment of the invention as described with reference to FIG. 10, even a small storage capacity which the memory for storing surrounding macro-block information has is sufficient as long as it can store the information 504 of macro-blocks (MBs) containing the vertical width of a frame of picture.

In general, a picture frame of a moving image is laterally elongated, and the vertical width of the picture frame is shorter than the horizontal width thereof. Examples of picture frame sizes include: 320×240 pixels as QVGA (Quarter Video Graphic Array) size; 720×480 pixels as a standard size; 1920×1080 pixels as HD (High Definition) size; 4096×2048 pixels of 4K×2K size; and 8192×4096 pixels of 8K×4K size. Therefore, in comparison to a large capacity enough to store the information of macro-blocks containing the horizontal width of a frame of picture, which is necessary for the conventional encoding process as described with reference to FIG. 9, the storage capacity of the surrounding macro-block information storing memory which is required for the encoding process according to the first embodiment of the invention as described with reference to FIG. 10 is smaller, which is comparable to the amount of information of macro-blocks containing the vertical width of a frame of picture.

<<Macro-Block Adaptive Type Frame-Field Prediction Mode>>

Figure 11:
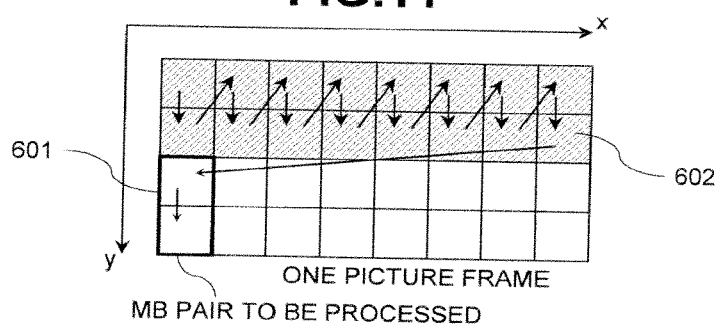
FIG. 11 is a view showing how two rows of pairs of macro-blocks (MBs) are encoded following a conventional encoding process in a macro-block adaptive type frame-field prediction mode introduced into an MPEG-4 AVC(H.264)-compliant encoding scheme.

FIG. 11 is a view showing how two rows of pairs of macro-blocks (MBs) are encoded following a conventional encoding process in a macro-block adaptive type frame-field prediction mode introduced into an MPEG-4 AVC(H.264)-compliant encoding scheme.

The conventional encoding process as shown by FIG. 11 requires the surrounding macro-block information storing memory to have a storage capacity large enough to store the information 602 of macro-blocks (MBs) containing double the horizontal width of the picture frame.

Figure 12:
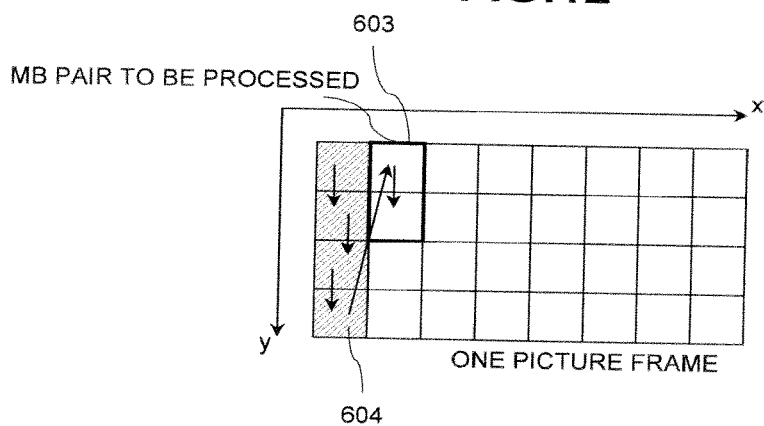
FIG. 12 is a view showing how pairs of macro-blocks (MBs) of the macro-block adaptive type frame-field prediction mode introduced into the MPEG-4 AVC(H.264)-compliant encoding scheme are encoded following the encoding process according to the first embodiment of the invention as described with reference to FIGS. 1 to 6.

FIG. 12 is a view showing how pairs of macro-blocks (MBs) of the macro-block adaptive type frame-field prediction mode introduced into the MPEG-4 AVC(H.264)-compliant encoding scheme are encoded following the encoding process according to the first embodiment of the invention as described with reference to FIGS. 1 to 6.

With the encoding process according to the first embodiment of the invention as described with reference to FIGS. 1 to 6, which is shown in FIG. 12, the memory for storing surrounding macro-block information having a storage capacity as small as the amount of information 604 of macro-blocks (MBs) containing the vertical width of a frame of picture will do.

Second Embodiment

<<Moving Image Encoding/Decoding Device According to the Second Embodiment>>

FIG. 13 is a view showing a configuration of a moving image encoding/decoding device according to the second embodiment of the invention.

The upper half portion of FIG. 13 shows an encoding device 701 operable to execute a moving image encoding process according to the second embodiment of the invention, and the lower half portion thereof shows a decoding device 711 operable to execute a moving image decoding process according to the second embodiment of the invention.

The encoding device 701 includes: an image-rotation module 703; an encoding module 704; and a surrounding macro-block information storing memory 705. The encoding device 701 executes a moving image encoding process on an original image stored in the external memory 702, and then outputs a moving image encoded bit stream and a reference image to the external memory 702.

The original image stored in the external memory 702 is supplied to the image-rotation module 703 of the encoding device 701. The image-rotation module 703 rotates the original image by +90° clockwise, and provides the resultant rotation image to the external memory 702. Therefore, the horizontal width of the original image stored in the external memory 702 is larger than the vertical width thereof. The original image is elongated laterally, in which according to the order of raster scan for picture frame display, the macro-blocks (MBs) 1, 2, 3 and 4 are aligned in the rightward horizontal direction, and the macro-blocks (MBs) 1, 5 and 9 are aligned in the downward vertical direction. Hence, the number of the macro-blocks (MBs) 1, 2, 3 and 4 aligned in the rightward horizontal direction of the horizontal width of the original image stored in the external memory 702 is larger than the number of the macro-blocks (MBs) 1, 5 and 9 aligned in the downward vertical direction of the vertical width of the original image.

On another note, the rotation image produced by clockwise rotating the original image by +90°□ in the image-rotation module 703 and then supplied to the external memory 702 has a smaller number of macro-blocks (MBs) 1, 5 and 9 in the horizontal direction of the horizontal width, and a larger number of macro-blocks (MBs) 1, 2, 3 and 4 in the vertical direction of the vertical width. Like the rotation image, the reference image stored in the external memory 702 has a smaller number of macro-blocks (MBs) 1, 5 and 9 in the horizontal direction of the horizontal width, and a larger number of macro-blocks (MBs) 1, 2, 3 and 4 in the vertical direction of the vertical width.

First, the encoding module 704 reads out the smaller number of macro-blocks (MBs) 9, 5 and 1 aligned in the horizontal direction of the horizontal width of a rotation image stored in the external memory 702, and the smaller number of macro-blocks (MBs) 9, 5 and 1 aligned in the horizontal direction the horizontal width of a reference image stored in the external memory 702 to execute the moving image encoding process in turn. Next, the encoding module 704 reads out the smaller number of macro-blocks (MBs) 10, 6 and 2 aligned in the horizontal direction of the horizontal width of each of the rotation image and the reference image stored in the external memory 702 to execute the moving image encoding process in turn. A moving image encoded bit stream produced by the moving image encoding process is stored in the external memory 702. A capacity depending on the number of the macro-blocks (MBs) 9, 5 and 1 aligned in the vertical direction of the vertical width of the original image stored in the external memory 702 is good enough as the storage capacity of the surrounding macro-block information storing memory 705 required for the moving image encoding process.

Therefore, in the case of forming the encoding device 701 with a system LSI, the surrounding macro-block information storing memory 705 with a relatively small storage capacity can be arranged as a built-in memory (on-chip SRAM) of the system LSI readily. In addition, the external memory 702 used to store an original image, a rotation image and a moving image encoded bit stream is composed of a synchronous dynamic random access memory (SDRAM).

The decoding device 711 includes: a decoding module 714; a surrounding macro-block information storing memory 715; and an image-rotation module 713.

First, the decoding module 714 reads out the smaller number of macro-blocks (MBs) 9, 5 and 1 aligned in the horizontal direction of the horizontal width of a moving image encoded bit stream stored in the external memory 712, and the smaller number of macro-blocks (MBs) 9, 5 and 1 aligned in the horizontal direction of the horizontal width of a reference image stored in the external memory 712 to execute the moving image decoding process in turn. Next, the decoding module 714 reads out the smaller number of macro-blocks (MBs) 10, 6 and 2 aligned in the horizontal direction of the horizontal width of the moving image encoded bit stream stored in the external memory 712, and the smaller number of macro-blocks (MBs) 10, 6 and 2 aligned in the horizontal direction of the horizontal width of the reference image stored in the external memory 712 to execute the moving image decoding process in turn. In addition, the moving image decoded bit stream produced by the moving image decoding process is stored in the external memory 712. Further, the image-rotation module 713 rotates, by 90°, a moving image decoded bit stream stored in the external memory 712 counterclockwise, and supplies the resultant streams, as a final moving image decoded bit stream, to the external memory 712 again. A capacity depending on the number of the macro-blocks (MBs) 9, 5 and 1 aligned in the horizontal direction of the horizontal width of the moving image encoded bit stream stored in the external memory 712 is good enough as the storage capacity of the surrounding macro-block information storing memory 715 which is necessary for the moving image decoding process.

Therefore, in the case of forming the decoding device 711 with a system LSI, the surrounding macro-block information storing memory 715 with a relatively small storage capacity can be arranged as a built-in memory (on-chip SRAM) of the system LSI readily. In addition, the external memory 712 used to store a moving image encoded bit stream, a rotation image and a moving image decoded bit stream is composed of a synchronous dynamic random access memory (SDRAM).

The moving image encoding device 701 and the moving image decoding device 711 according to the second embodiment of the invention shown in FIG. 13 can be integrated into a semiconductor chip of a moving image encoding/decoding device formed by a system LSI. In this case, the encoding module 704 and the decoding module 714 can be constituted by hardware resources common to them; the surrounding macro-block information storing memory 705 and the surrounding macro-block information storing memory 715 can be constituted by hardware resources common to them; and the image-rotation module 703 and the image-rotation module 713 can be constituted by hardware resources common to them. The moving image encoding/decoding device formed by a system LSI can be arranged to appropriately work as the encoding device 701 or the decoding device 711 following operation mode setting information supplied during initialization sequence at power-on for example.

Third Embodiment

<<Moving Image Encoding/Decoding Device According to the Third Embodiment>>

FIG. 14 is a view showing a configuration of a moving image encoding/decoding device according to the third embodiment of the invention.

Unlike the moving image encoding/decoding device according to the second embodiment of the invention shown in FIG. 13, the frequency of access to the external memory 902 can be reduced in the moving image encoding/decoding device according to the third embodiment of the invention shown in FIG. 14.

The upper half portion of FIG. 14 shows the encoding device 901 operable to execute a moving image encoding process according to the third embodiment of the invention, and the lower half portion thereof shows a decoding device 911 operable to execute a moving image decoding process according to the third embodiment of the invention.

The encoding device 901 includes: a 90°-clockwise rotation module 903; an encoding module 904; a surrounding macro-block information storing memory 905; and an image read address generating module 906. The encoding device 901 executes a moving image encoding process on an original image stored in the external memory 902, and then outputs a moving image encoded bit stream and a reference image to the external memory 902.

Macro-blocks (MBs) of the original image stored in the external memory 902 are supplied to the 90°-clockwise rotation module 903 of the encoding device 901 according to addresses generated by the image read address generating module 906. The 90°-clockwise rotation module 903 rotates the supplied macro-blocks (MBs) by +90° clockwise, and provides the resultant images to the encoding module 904. Specifically, an original image stored in the external memory 902 is laterally elongated with its horizontal width larger than the vertical width, in which according to the order of raster scan for picture frame display, the macro-blocks (MBs) 1, 2, 3 and 4 are aligned in the rightward horizontal direction, and the macro-blocks (MBs) 1, 5 and 9 are aligned in the downward vertical direction. Therefore, the number of the macro-blocks (MBs) 1, 2, 3 and 4 aligned in the rightward horizontal direction of the horizontal width of the original image stored in the external memory 902 is larger than the number of the macro-blocks (MBs) 1, 5 and 9 aligned in the downward vertical direction of the vertical width of the original image.

On another note, the rotation image supplied to the encoding module 904 after the +90° clockwise rotation by the image-rotation module 703 includes a smaller number of macro-blocks (MBs) 9, 5 and 1 in the horizontal direction of the horizontal width, and a larger number of macro-blocks (MBs) 1, 2, 3 and 4 in the vertical direction of the vertical width. Also, a reference image stored in the external memory 902 includes a smaller number of macro-blocks (MBs) 9, 5 and 1 in the horizontal direction of the horizontal width, and a larger number of macro-blocks (MBs) 1, 2, 3 and 4 in the vertical direction of the vertical width as in the case of the rotation image.

The encoding module 904 first reads out the smaller number of macro-blocks (MBs) 9, 5 and 1 aligned in the horizontal direction of the horizontal width of a rotation image supplied from the 90°-clockwise rotation module 903, and the smaller number of macro-blocks (MBs) 9, 5 and 1 aligned in the horizontal direction of the horizontal width of the reference image stored in the external memory 902 to execute the moving image encoding process in turn. Next, the encoding module 904 reads out the smaller number of macro-blocks (MBs) 10, 6 and 2 aligned in the horizontal direction of the horizontal width of each of the rotation image supplied by the 90°-clockwise rotation module 903 and the reference image stored in the external memory 902 to execute the moving image encoding process in turn. Further, the moving image encoded bit stream produced by the moving image encoding process is stored in the external memory 902. A capacity depending on the number of the macro-blocks (MBs) 1, 5 and 9 aligned in the vertical direction of the vertical width of the original image stored in the external memory 902 is good enough as the storage capacity of the surrounding macro-block information storing memory 905 which is necessary for the moving image encoding process.

Therefore, in the case of forming the encoding device 901 with a system LSI, the surrounding macro-block information storing memory 905 with a relatively small storage capacity can be arranged as a built-in memory (on-chip SRAM) of the system LSI readily. In addition, the external memory 902 used to store the original image and the moving image encoded bit stream is composed of a synchronous dynamic random access memory (SDRAM). Further, a motion vector MV1 encoded by the moving image encoding process in the encoding device 901 is also rotated by +90° clockwise by the 90°-clockwise rotation module 903 with respect to the motion vector in the original image stored in the external memory 902.

The decoding device 911 includes: a decoding module 914; a surrounding macro-block information storing memory 915; a 90°-counterclockwise rotation module 913; an image read address generating module 916; a difference image generating module 917; and an image write address generating module 918.

The decoding module 914 first reads out, in turn, a smaller number of macro-blocks (MBs) 9, 5 and 1 of a moving image encoded bit stream stored in the external memory 912, provided that the macro-blocks (MBs) 9, 5 and 1 are aligned in the horizontal direction of the horizontal width. The smaller number of macro-blocks (MBs) 9, 5 and 1 of moving image encoded bit stream so read out from the external memory 912 are supplied to the 90°-counterclockwise rotation module 913 through the difference image generating module 917. The 90°-counterclockwise rotation module 913 creates macro-blocks (MBs) 9, 5 and 1 aligned in the vertical direction of the vertical width and supplies them to the decoding module 914.

The image read address generating module 916 reads out macro-blocks (MBs) 9, 5 and 1 aligned in the vertical direction of the vertical width of a reference image stored in the external memory 712 in turn. Therefore, the decoding module 914 uses the macro-blocks (MBs) 9, 5 and 1 of moving image encoded bit stream, and the macro-blocks (MBs) 9, 5 and 1 of the reference image to execute the moving image decoding process. A moving image decode bit stream resulting from the moving image decoding process by the decoding module 914 is stored in the external memory 712 according to an address generated by the image write address generating module 918. A capacity depending on the number of the macro-blocks (MBs) 9, 5 and 1 aligned in the horizontal direction of the horizontal width of a moving image encoded bit stream stored in the external memory 912 is good enough as the storage capacity of the surrounding macro-block information storing memory 915 which is necessary for the moving image decoding process.

Therefore, in the case of forming the decoding device 911 with a system LSI, the surrounding macro-block information storing memory 915 with a relatively small storage capacity can be arranged as a built-in memory (on-chip SRAM) of the system LSI readily. In addition, the external memory 912 used to store a moving image encoded bit stream, a reference image and a moving image decode bit stream is composed of a synchronous dynamic random access memory (SDRAM). Further, a motion vector MV2 decoded by the moving image decoding process in the decoding device 911 is made by a coordinate transform of a motion vector MV1, by which the x-coordinate of the motion vector MV1 encoded by the moving image encoding process in the encoding device 901 is made a y-coordinate of the motion vector MV2, and the y-coordinate of the motion vector MV1 is made an x-coordinate of the motion vector MV2, provided that the sign of the x-coordinate of the motion vector MV2 is minus.

The moving image encoding device 901 and the moving image decoding device 911 according to the third embodiment of the invention shown in FIG. 14 can be integrated into a semiconductor chip of a moving image encoding/decoding device formed by a system LSI. In this case, the encoding module 904 and the decoding module 914 can be constituted by hardware resources common to them; the surrounding macro-block information storing memory 905 and the surrounding macro-block information storing memory 915 can be constituted by hardware resources common to them; and the 90°-clockwise rotation module 903 and the 90°-counterclockwise rotation module 913 can be constituted by hardware resources common to them. The moving image encoding/decoding device formed by a system LSI can be arranged to appropriately work as the encoding device 901 or the decoding device 911 following operation mode setting information supplied during initialization sequence at power-on for example.

Fourth Embodiment

<<Moving Image Encoding/Decoding Device According to the Fourth Embodiment>>

FIG. 15 is a view showing a configuration of a moving image encoding/decoding device according to the fourth embodiment of the invention.

Unlike the moving image encoding/decoding device according to the third embodiment of the invention shown in FIG. 14, the arrangement of macro-blocks (MBs) of a reference image stored in the external memory 1302 can be made identical with the arrangement of macro-blocks (MBs) of an original image in the moving image encoding/decoding device according to the fourth embodiment of the invention shown in FIG. 15.

The upper half portion of FIG. 15 shows the encoding device 1301 operable to execute a moving image encoding process according to the fourth embodiment of the invention, and the lower half portion of FIG. 15 shows the decoding device 1311 operable to execute a moving image decoding process according to the fourth embodiment of the invention.

The encoding device 1301 includes: a 90°-clockwise rotation module 1303; an encoding module 1304; a surrounding macro-block information storing memory 1305; an image read address generating module 1306; a difference image generating module 1307; a reference image address generating module 1308; and a 90°-counterclockwise rotation module 1309. The encoding device 1301 executes the moving image encoding process on an original image stored in the external memory 1302, and then outputs a moving image encoded bit stream and a reference image to the external memory 1302.

The smaller number of macro-blocks (MBs) 9, 5 and 1 aligned in the vertical direction of the vertical width of each of an original image and a reference picture frame are read out from the external memory 1302 according to addresses generated by the image read address generating module 1306, and supplied to the difference image generating module 1307 in turn. An output signal of the difference image generating module 1307 is supplied to the 90°-clockwise rotation module 1303. The 90°-clockwise rotation module 1303 rotates the supplied macro-block (MB) by +90° clockwise into a rotation image, and provides the rotation image to the encoding module 1304. Specifically, an original image stored in the external memory 1302 is laterally elongated with its horizontal width larger than the vertical width, in which according to the order of raster scan for picture frame display, the macro-blocks (MBs) 1, 2, 3 and 4 are aligned in the rightward horizontal direction, and the macro-blocks (MBs) 1, 5 and 9 are aligned in the downward vertical direction. Therefore, the number of the macro-blocks (MBs) 1, 2, 3 and 4 aligned in the rightward horizontal direction of the horizontal width of the original image stored in the external memory 1302 is larger than the number of the macro-blocks (MBs) 1, 5 and 9 aligned in the downward vertical direction of the vertical width of the original image.

On another note, the rotation image supplied to the encoding module 1304 after the +90° clockwise rotation by the 90°-clockwise rotation module 1303 includes a smaller number of macro-blocks (MBs) 9, 5 and 1 in the horizontal direction of the horizontal width, and a larger number of macro-blocks (MBs) 1, 2, 3 and 4 in the vertical direction of the vertical width.

The encoding module 1304 handles macro-blocks (MBs) 9, 5 and 1 of output signals of the difference image generating module 1307 which are supplied through the 90°-clockwise rotation module 1303 to execute the moving image encoding process in turn. Next, the encoding module 1304 handles macro-blocks (MBs) 10, 6 and 2 of output signals of the difference image generating module 1307 which are supplied from the 90°-clockwise rotation module 1303 to execute the moving image encoding process in turn. A moving image encoded bit stream produced by the moving image encoding process by the encoding module 1304 and output therefrom is stored in the external memory 1302. An output of the encoding module 1304 is also supplied to the 90°-counterclockwise rotation module 1309. An output of the 90°-counterclockwise rotation module 1309 is stored in the external memory 1302 as a reference image, according to a reference image address generated by the reference image address generating module 1308. A capacity depending on the number of the macro-blocks (MBs) 1, 5 and 9 aligned in the vertical direction of the vertical width of the original image stored in the external memory 1302 is good enough as the storage capacity of the surrounding macro-block information storing memory 1305 which is necessary for the moving image encoding process.

Therefore, in the case of forming the encoding device 1301 with a system LSI, the surrounding macro-block information storing memory 1305 with a relatively small storage capacity can be arranged as a built-in memory (on-chip SRAM) of the system LSI readily. In addition, the external memory 1302 used to store an original image, a reference image and a moving image encoded bit stream is composed of a synchronous dynamic random access memory (SDRAM). Further, a motion vector MV1 encoded by the moving image encoding process in the encoding device 1301 is also rotated by +90° clockwise by the 90°-clockwise rotation module 1303 with respect to the motion vector in the original image stored in the external memory 1302.

The decoding device 1311 includes: a decoding module 1314; a surrounding macro-block information storing memory 1315; a 90°-counterclockwise rotation module 1313; an image read address generating module 1316; a difference image generating module 1317; and an image write address generating module 1318.

The decoding module 1314 first reads out a smaller number of macro-blocks (MBs) 9, 5 and 1 aligned in the horizontal direction of the horizontal width of a moving image encoded bit stream stored in the external memory 1312 in turn. The smaller number of macro-blocks (MBs) 9, 5 and 1 of the moving image encoded bit stream read out from the external memory 1312 in sequence, which are aligned in the horizontal direction of the horizontal width, are supplied to the 90°-counterclockwise rotation module 1313 through the difference image generating module 1317. The 90°-counterclockwise rotation module 1313 creates plural macro-blocks (MBs) 9, 5 and 1 aligned in the vertical direction of the vertical width and supplies them to the decoding module 1314.

Further, the image read address generating module 1316 reads out plural macro-blocks (MBs) 9, 5 and 1 aligned in the vertical direction of the vertical width of a reference image stored in the external memory 1312 in turn and therefore, the decoding module 1314 uses the macro-blocks (MBs) 9, 5 and 1 of the moving image encoded bit stream and the macro-blocks (MBs) 9, 5 and 1 of the reference image to execute the moving image decoding process. A moving image decode bit stream produced by the moving image decoding process by the decoding module 1314 is stored in the external memory 1312 according to an address generated by the image write address generating module 1318. A capacity depending on the number of macro-blocks (MBs) 9, 5 and 1 aligned in the horizontal direction of the horizontal width of a moving image encoded bit stream stored in the external memory 1312 is good enough as the storage capacity of the surrounding macro-block information storing memory 915 which is necessary for the moving image decoding process.

As a result, in the case of forming the decoding device 1311 with a system LSI, the surrounding macro-block information storing memory 1315 with a relatively small storage capacity can be arranged as a built-in memory (on-chip SRAM) of the system LSI readily. In addition, the external memory 1312 used to store a moving image encoded bit stream, a reference image and a moving image decode bit stream is composed of a synchronous dynamic random access memory (SDRAM). Further, a motion vector MV2 decoded by the moving image decoding process in the decoding device 1311 is made by a coordinate transform of a motion vector MV1, by which the x-coordinate of the motion vector MV1 encoded by the moving image encoding process in the encoding device 1301 is made a y-coordinate of the motion vector MV2, and the y-coordinate of the motion vector MV1 is made an x-coordinate of the motion vector MV2, provided that the sign of the x-coordinate of the motion vector MV2 is minus.

The moving image encoding device 1301 and the moving image decoding device 1311 according to the fourth embodiment of the invention shown in FIG. 15 can be integrated into a semiconductor chip of a moving image encoding/decoding device formed by a system LSI. In this case, the encoding module 1304 and the decoding module 1314 can be constituted by hardware resources common to them; the surrounding macro-block information storing memory 1305 and the surrounding macro-block information storing memory 1315 can be constituted by hardware resources common to them; and the 90°-clockwise rotation module 1303 and the 90°-counterclockwise rotation module 1313 can be constituted by hardware resources common to them. The moving image encoding/decoding device formed by a system LSI can be arranged to appropriately work as the encoding device 1301 or the decoding device 1311 following operation mode setting information supplied during initialization sequence at power-on for example.

Fifth Embodiment

<<Moving Image Processing Device According to the Fifth Embodiment>>

FIG. 16 is a view showing a structure of a moving image processing device 1750 according to the fifth embodiment of the invention, which can be used as any of the following modules: the macro-block encoding/decoding module 203 of the moving image encoding/decoding device 201 according to the first embodiment of the invention shown in FIG. 5; the encoding module 704 of the encoding device 701 and the decoding module 714 of the decoding device 711 according to the second embodiment of the invention shown in FIG. 13; the encoding module 904 of the encoding device 901, and the decoding module 1914 of the decoding device 1911 according to the third embodiment of the invention shown in FIG. 14; and the encoding module 1304 of the encoding device 1301 and the decoding module 1914 of the decoding device 1311 according to the fourth embodiment of the invention shown in FIG. 15.

The moving image processing device 1750 according to the fifth embodiment of the invention shown in FIG. 16 includes: a variable length coding/decoding module (VLCS) 1703; a first moving image processing unit (CODEC1) 1719; a second moving image processing unit (CODEC2) 1729; a memory control module (MEC) 1714; a local memory controller (LMC) 1724; a total control module (CTRL) 1715; a DMA controller (DMAC) 1725; an external bus 1701; and an internal bus 1702. According to a preferred embodiment, the moving image processing device 1750 is arranged in the form of a semiconductor LSI (Large Scale Integrated Circuits) formed on a semiconductor substrate, e.g. a monocrystalline silicon substrate. In addition, the moving image processing device 1750 according to the fifth embodiment of the invention shown in FIG. 16 can be arranged to appropriately work as an encoding device or a decoding device following operation mode setting information supplied during initialization sequence at power-on.

<<Variable Length Coding/Decoding Module>>

The variable length coding/decoding module (VLCS) 1703 is supplied with encoded data of a moving image in the form of a bit stream (BS) from a medium, such as a HDD (Hard Disk Drive), an optical disk drive, a large-capacity nonvolatile flash memory, or a wireless LAN (Local Area Network) through the DMA controller 1725. The variable length coding/decoding module (VLCS) 1703 has therein a stream-analyzing module. The stream-analyzing module supplies the first moving image processing unit (CODEC1) 1719 with macro-blocks located in rows labeled with odd ordinal numbers like the first row, the third row, and so on, and supplies the second moving image processing unit (CODEC2) 1729 with macro-blocks located in rows labeled with even ordinal numbers like the second row, the fourth row, and so on.

The variable length coding/decoding module (VLCS) 1703 has therein a pipeline control module. The pipeline control module controls pipeline operations for a parallel operation of the first moving image processing unit (CODEC1) 1719 and the second moving image processing unit (CODEC2) 1729 on macro-blocks. Specifically, the pipeline operation involving the first variable length coding/decoding module (VLCF1) 1710, the first frequency conversion module (TRF1) 1711, the first motion compensation module (FME1) 1712 and the first deblocking filter (DEB1) 1713, which are internal circuits of the first moving image processing unit (CODEC1) 1719, is executed under the control of the pipeline control module of the variable length coding/decoding module (VLCS) 1703. Further, the pipeline operation involving the second variable length coding/decoding module (VLCF2) 1720, the second frequency conversion module (TRF2) 1721, the second motion compensation module (FME2) 1722, and the second deblocking filter (DEB2) 1723, which are internal circuits of the second moving image processing unit (CODEC2) 1729, is executed under the control of the pipeline control module of the variable length coding/decoding module (VLCS) 1703. Hence, the parallel operation of the first moving image processing unit (CODEC1) 1719 and the second moving image processing unit (CODEC2) 1729 which includes the execution of the pipeline operations is arranged to be suitable for the encoding/decoding process of pairs of macro-blocks (MBs) in macro-block adaptive type frame-field prediction mode according to the first embodiment of the invention as described with reference to FIG. 12.

As described above, the variable length coding/decoding module (VLCS) 1703 has the function of determining values of a group of parameters necessary for the first moving image processing unit (CODEC1) 1719 and the second moving image processing unit (CODEC2) 1729 in the subsequent stage by performing the variable-length decoding of a bit stream supplied thereto thereby to extract a macro-block type and a motion vector.

<<Variable Length Coding/Decoding Module>>

The variable length coding/decoding module (VLCS) 1703 supplies macro-blocks in rows labeled with odd ordinal numbers, and macro-blocks in rows labeled with even ordinal numbers to the first variable length coding/decoding module (VLCF1) 1710 and the second variable length coding/decoding module (VLCF2) 1720, respectively. Then, the first variable length coding/decoding module (VLCF1) 1710 and the second variable length coding/decoding module (VLCF2) 1720 perform context-based adaptive variable length coding/decoding on the macro-blocks, thereby to encode/decode motion vector information, macro-block parameters, and frequency conversion information.

<<Frequency Conversion Module>>

On acceptance of supplies of frequency conversion information from the first variable length coding/decoding module (VLCF1) 710 and the second variable length coding/decoding module (VLCF2) 1720, the first frequency conversion module (TRF1) 1711 and the second frequency conversion module (TRF2) 1721 execute IQ (Inverse Quantization) and IDCT (Inverse Discrete Cosine Transform). Specifically, the first frequency conversion module (TRF1) 1711 and the second frequency conversion module (TRF2) 1721 process quantization conversion coefficients and quantization parameters as frequency conversion information supplied from the first variable length coding/decoding module (VLCF1) 1710 and the second variable length coding/decoding module (VLCF2) 1720, perform the inverse quantization conversion to calculate conversion coefficients, perform the inverse orthogonal transform on the conversion coefficients thus calculated to determine pixel values or interframe prediction residuals, add the interframe prediction residuals to a reference image supplied from the first motion compensation module (FME1) 1712 and the second motion compensation module (FME2) 1722 to calculate pixel values, and output a resultant image.

<<Motion Compensation Module>>

The first Motion compensation module (FME1) 1712 and the second motion compensation module (FME2) 1722 execute motion compensation. Specifically, the first motion compensation module (FME1) 1712 and the second motion compensation module (FME2) 1722 execute a motion search using a reference image supplied from the external memory through the memory control module (MEC) 1714, the internal bus 1702, the DMA controller (DMAC) 1725 and the external bus 1701, thereby to calculate a reference image at a position indicated by a motion vector, and output the reference image thus calculated to the first frequency conversion module (TRF1) 1711 and the second frequency conversion module (TRF2) 1721.

<<Deblocking Filter>>

The first deblocking filter (DEB1) 1713, and the second deblocking filter (DEB2) 1723 execute a deblocking filtering process for reducing a block distortion produced at the time of image decoding. Specifically, the first and second deblocking filters (DEB1, DEB2) 1713 and 1723 execute a deblocking filtering using image data of macro-blocks (MBs) made subjects of the processing and supplied from the first and second frequency conversion modules (TRF1, TRF2) 1711 and 1721, and image data of left-side macro-blocks (MBs) made subjects of the processing and supplied from built-in memories in the first and second deblocking filters (DEB1, DEB2) 1713 and 1723.

<<Memory Control Module>>

According to the information of a motion vector supplied from the first and second variable length coding/decoding modules (VLCF1, VLCF2) 1710 and 1720, the memory control module (MEC) 1714 supplies a reference image to use for interframe prediction from the external memory to the first and second motion compensation modules (FME1, FME2) 1712 and 1722 through the internal bus 1702, the DMA controller (DMAC) 1725 and the external bus 1701.

<<Total Control Module>>

The total control module (CTRL) 1715 controls all the internal circuits of the moving image processing device 1750 in their operations. For instance, the total control module (CTRL) 1715 produces a operation control signal deb_start for controlling the operations of the first and second deblocking filters (DEB1, DEB2) 1713 and 1723.

<<Local Memory Controller>>

The local memory controller (LMC) 1724 controls write and read operations on: the surrounding macro-block information storing memory 204 of the moving image encoding/decoding device (CODEC) 201 according to the first embodiment of the invention shown in FIG. 5; the surrounding macro-block information storing memory 705 of the encoding device 701, and the surrounding macro-block information storing memory 715 of the decoding device 711, according to the second embodiment of the invention shown in FIG. 13; the surrounding macro-block information storing memory 905 of the encoding device 901, and the surrounding macro-block information storing memory 915 of the decoding device 1911 according to the third embodiment of the invention shown in FIG. 14; and the surrounding macro-block information storing memory 1305 of the encoding device 1301, and the surrounding macro-block information storing memory 1315 of the decoding device 1311 according to the fourth embodiment of the invention shown in FIG. 15.

For instance, the local memory controller (LMC) 1724 stores results of the processing by the first moving image processing unit (CODEC1) 1719 assigned macro-blocks (MBs) of odd rows, and relevant parameters in the surrounding macro-block information storing memories, and transfers a required image and relevant parameters to the second moving image processing unit (CODEC2) 1729 assigned macro-blocks (MBs) of even rows. Also, the local memory controller (LMC) 1724 stores results of the processing by the second moving image processing unit (CODEC2) 1729 assigned the macro-blocks (MBs) of even rows, and the relevant parameters in the surrounding macro-block information storing memories, and transfers a required image and relevant parameters to the first moving image processing unit (CODEC1) 1719 assigned macro-blocks (MBs) of odd rows. As described above, the local memory controller (LMC) 1724 executes the operation of storing surrounding macro-block information in the surrounding macro-block information storing memories, and the operation of reading such information from the surrounding macro-block information storing memories, and is connected with a built-in memory (on-chip SRAM) forming the surrounding macro-block information storing memory built in the semiconductor chip of the moving image encoding/decoding device (CODEC) including a system large-scale semiconductor integrated circuit (system LSI).

<<DMA Controller>>

The DMA controller (DMAC: Direct Memory Access Controller) 1725 is connected with the external bus 1701 of the moving image processing device 1750. For instance, the DMA controller is used for high-speed data transfer of a reference image or encoded bit stream which includes a large volume of macro-blocks (MBs) between the external memory formed by a synchronous dynamic random access memory (SDRAM) and the first and second moving image processing units 1719 and 1729.

In the case of the moving image processing device 1750 according to the fifth embodiment of the invention shown in FIG. 16 working as a decoding device, the first variable length coding/decoding module (VLCF1) 1710, the first frequency conversion module (TRF1) 1711 and the first motion compensation module (FME1) 1712 of the first moving image processing unit (CODEC1) 1719 operate as a variable length decoding module, an inverse quantizer/inverse DCT converter, and a motion compensation module respectively. Likewise, the second variable length coding/decoding module (VLCF2) 1720, the second frequency conversion module (TRF2) 1721 and the second Motion compensation module (FME2) 1722 of the second moving image processing unit (CODEC2) 1729 operate as a variable length decoding module, an inverse quantizer/inverse DCT converter and a motion compensation module respectively.

Further, in the case of the moving image processing device 1750 according to the fifth embodiment of the invention shown in FIG. 16 working as an encoding device, the first variable length coding/decoding module (VLCF1) 1710, the first frequency conversion module (TRF1) 1711 and the first motion compensation module (FME1) 1712 of the first moving image processing unit (CODEC1) 1719 operate as a variable length encoding module forming a residual encoding module, a DCT converter/quantizer, and a motion prediction module respectively. Likewise, the second variable length coding/decoding module (VLCF2) 1720, the second frequency conversion module (TRF2) 1721 and the second motion compensation module (FME2) 1722 of the second moving image processing unit (CODEC2) 1729 operate as a variable length encoding module forming a residual encoding module, a DCT converter/quantizer and a motion prediction module respectively.

The invention made by the inventor has been described above based on the various embodiments thereof specifically. However, it is obvious that the invention is not so limited, and various changes and modifications thereof may be made without departing from the subject matter thereof.

For instance, in the fifth embodiment of the invention which has been described with reference to FIG. 16, the first variable length coding/decoding module (VLCF1) 1710, the first frequency conversion module (TRF1) 1711, and the first Motion compensation module (FME1) 1712 of the first moving image processing unit (CODEC1) 1719, and the second variable length coding/decoding module (VLCF2) 1720, the second frequency conversion module (TRF2) 1721, and the second motion compensation module (FME2) 1722 of the second moving image processing unit (CODEC2) 1729 are not limited to be materialized in the forms of hardware. Operation functions thereof can be realized by e.g. software processing by e.g. a microprocessor. In such case, cache memories of a microprocessor and the like may be used for the surrounding macro-block information storing memories 204, 705, 715, etc.

The moving image encoding/decoding devices according to the various embodiments of the invention described above can be provided in e.g. mobile telephones, car navigation systems, DVD/HDD/BD recorders, digital video cameras, digital cameras, digital television sets, and telephone meeting systems.

What is claimed is:

1. A moving image encoding device comprising:
   a first memory for storing surrounding macroblock that are used for prediction;
   an encoding circuit configured to:
      encode an image from a stream of moving images received from a second memory external from the moving image encoding device;
      generate a reference image and stores the reference image into the second memory, and
      output a bit stream including the encoded image;
   an image rotation circuit configured to rotate an original image stored in the second memory by 90° and output the rotated image to the encoding circuit, the original image being constituted of a plurality of columns and a plurality of rows of which widths are longer than the columns; and
   a read address generating circuit configured to read the column of the original image from the second memory, and provide the column with the image rotation circuit including reading a group of addresses of an array of vertically aligned macro-blocks at a time,
   wherein the image rotation circuit rotates the original image by rotating 90° each macro-block of the original image in an array of macro-blocks read out from the second memory according to an address generated by the read address generating circuit and supplies the rotation image to the encoding circuit for transmission back to the second memory,
   wherein the encoding circuit encodes each macro block of the rotated image supplied from the image rotation circuit following an order of a raster scan starting with a macro block located at an upper left corner portion of the rotated image, which is a macro block located at a left bottom corner portion of the original image,
   wherein the surrounding macroblock information regarding macroblocks that surround a macroblock to be encoded are stored in the first memory, the surrounding macroblocks used for prediction of the macroblock to be encoded are all already encoded when processing the macroblock to be encoded.

2. The image encoding device according claim 1, wherein the encoding circuit receives the rotated column from the image rotation circuit, and encodes the rotated column in a horizontal direction.

3. The image encoding device according claim 1, wherein
the image rotation circuit reads the original image from the second memory, and
the encoding circuit encodes the image based on the original image and the reference image read from the second memory.

4. The image encoding device according claim 1, further comprising:
a difference image generating circuit configured generate a difference image between the original image and the reference image,
wherein the image rotation circuit rotates the difference image and provides the rotated image to the encoding circuit.

5. A moving image encoding device comprising:
a first memory for storing surrounding macroblock that are used for prediction;
an image rotation circuit configured to rotate an original image from a stream of moving images stored in a second memory external from the moving image encoding device by 90° and store the rotated image to the second memory, the original image being constituted of a plurality of columns and a plurality of rows of which widths are longer than the columns; and
an encoding circuit configured to:
  encode the rotated image and
  generate a reference image and stores the reference image into the second memory, and
  output a bit stream including the encoded image,
wherein the image rotation circuit rotates the original image by rotating 90° each macro-block of the original image in an array of macro-blocks read out from the second memory according to an address generated by the read address generating circuit and supplies the rotation image to the encoding circuit for transmission back to the second memory,
wherein the encoding circuit encodes each macro block of the rotated image supplied from the image rotation circuit following an order of a raster scan starting with a macro block located at an upper left corner portion of the rotated image, which is a macro block located at a left bottom corner portion of the original image, the encoding circuit reads a group of addresses of an array of vertically aligned macro-blocks at a time, and
wherein the surrounding macroblock information regarding macroblocks that surround a macroblock to be encoded are stored in the first memory, the surrounding macroblocks used for prediction of the macroblock to be encoded are all already encoded when processing the macroblock to be encoded.

6. The image encoding device according claim 1, wherein
the image rotation circuit receives the information of the column from the read address generating circuit to rotate the original image.

7. The image encoding device according claim 5, wherein
the image rotation circuit receives the information of the column of the original image to rotate the original image and storing as the rotated image for encoding.

8. The image encoding device according claim 5, wherein
the encoding circuit receives the rotated column from the image rotation circuit, and encodes the rotated column in a horizontal direction.

9. The image encoding device according claim 5, wherein
the original image is stored in the second memory and the image rotation circuit reads the original image from the second memory, and
the encoding circuit encodes the image based on the original image and the reference image read from the second memory.

10. The image encoding device according claim 5, further comprising:
a difference image generating circuit configured to receive the original image and the reference image from the second memory, and generate a difference image between the original image and the reference image,
wherein the image rotation circuit rotates the difference image and provides the rotated image to the encoding circuit.

11. The image encoding device according claim 1, wherein the read address generating circuit reads out, from the memory, the array of macro-blocks vertically aligned at a left end of a horizontal width of the image to supply a read array of macro-blocks to the encoding circuit.

12. The image encoding device according claim 11, wherein the read address generating circuit then subsequently reads out an adjacent array of macro-blocks vertically aligned horizontally on the right of the left end of the horizontal width of the image to supply the read array of macro-blocks to the encoding circuit.

13. The moving image encoding device according claim 1, wherein
the encoding circuit encodes the plurality of macroblocks included in the stream of moving images of a landscape screen having a horizontal width larger than a vertical width,
the information of the plurality of encoded plurality of macroblocks around a macroblock to be encoded is stored in the first memory when the encoding processing unit encodes the plurality of macroblocks,
at a time of the encoding of the plurality of macroblocks, the plurality of macroblocks arranged in the vertical direction at the left end of the horizontal width of the horizontally long screen are sequentially encoded by the encoding circuit at first,
the encoding information of the plurality of macroblocks arranged in the vertical direction at the left end is stored in the first memory by the encoding circuit, and
after the plurality of macroblocks arranged in the vertical direction are encoded, the plurality of macroblocks arranged in the vertical direction next to the left side in the horizontal direction of the horizontal width of the horizontally long screen are then encoded.

14. The moving image encoding device according claim 1, wherein the read address generating circuit configured to read the column of the original image from the second memory, and provide the column with the image rotation circuit including reading a group of addresses of an array of vertically aligned macro-blocks at a time for storage in the first memory as encoded macro-blocks.

15. The moving image encoding device according claim 5, wherein
the encoding circuit encodes the plurality of macroblocks included in the stream of moving images of a landscape screen having a horizontal width larger than a vertical width,
the information of the plurality of encoded plurality of macroblocks around a macroblock to be encoded is stored in the first memory when the encoding processing unit encodes the plurality of macroblocks,
at a time of the encoding of the plurality of macroblocks, the plurality of macroblocks arranged in the vertical direction at the left end of the horizontal width of the horizontally long screen are sequentially encoded by the encoding circuit at first, the encoding information of the plurality of macroblocks arranged in the vertical direction at the left end is stored in the first memory by the encoding circuit, and after the plurality of macroblocks arranged in the vertical direction are encoded, the plurality of macroblocks arranged in the vertical direction next to the left side in the horizontal direction of the horizontal width of the horizontally long screen are then encoded.

16. The moving image encoding device according claim 5, wherein the encoding circuit is configured to read the column of the original image from the second memory, and provide the column with the image rotation circuit including reading a group of addresses of an array of vertically aligned macro-blocks at a time for storage in the first memory as encoded macro-blocks.

17. A moving image encoding device comprising:
a first memory for storing surrounding macroblock that are used for prediction;
an encoding circuit configured to:
    encode an image from a stream of moving images received from a second memory external from the moving image encoding device;
    generate a reference image and stores the reference image into the second memory, and
    output a bit stream including the encoded image;
an image rotation circuit configured to rotate an original image stored in the second memory and output the rotated image to the encoding circuit, the original image including a plurality of columns and a plurality of rows of which widths are longer than the columns; and
a read address generating circuit configured to read the column of the original image from the second memory, and provide the column with the image rotation circuit including reading a group of addresses of an array of vertically aligned macro-blocks at a time,
wherein the image rotation circuit rotates the original image by rotating each macro-block of the original image in an array of macro-blocks read out from the second memory according to an address generated by the read address generating circuit and supplies the rotation image to the encoding circuit for transmission back to the second memory, wherein the encoding circuit encodes each macro block of the rotated image supplied from the image rotation circuit following an order of a raster scan starting with a macro block located at an upper left corner portion of the rotated image, which is a macro block located at a left bottom corner portion of the original image.

18. The moving image encoding device according claim 17, wherein the read address generating circuit configured to read the column of the original image from the second memory, and provide the column with the image rotation circuit including reading a group of addresses of an array of vertically aligned macro-blocks at a time for storage in the first memory as encoded macro-blocks.

19. The moving image encoding device according claim 17,
wherein the surrounding macroblock information regarding macroblocks that surround a macroblock to be encoded are stored in the first memory, the surrounding macroblocks used for prediction of the macroblock to be encoded are all already encoded when processing the macroblock to be encoded,
wherein the encoding circuit encodes the plurality of macroblocks included in the stream of moving images of a landscape screen having a horizontal width larger than a vertical width,
the information of the plurality of encoded plurality of macroblocks around a macroblock to be encoded is stored in the first memory when the encoding processing unit encodes the plurality of macroblocks,
at a time of the encoding of the plurality of macroblocks, the plurality of macroblocks arranged in the vertical direction at the left end of the horizontal width of the horizontally long screen are sequentially encoded by the encoding circuit at first,
the encoding information of the plurality of macroblocks arranged in the vertical direction at the left end is stored in the first memory by the encoding circuit, and
after the plurality of macroblocks arranged in the vertical direction are encoded, the plurality of macroblocks arranged in the vertical direction next to the left side in the horizontal direction of the horizontal width of the horizontally long screen are then encoded.

* * * * *